United States Patent [19]

Kennedy, III et al.

[11] Patent Number: 6,167,255
[45] Date of Patent: Dec. 26, 2000

[54] SYSTEM AND METHOD FOR PROVIDING MENU DATA USING A COMMUNICATION NETWORK

[75] Inventors: William C. Kennedy, III, Dallas; Dale E. Beasley, Flower Mound; Terry S. Parker, Monticello; Thomas D. Russell, Plano; William C. Saunders, Dallas, all of Tex.

[73] Assignee: @TRACK Communications, Inc., Richardson, Tex.

[21] Appl. No.: 09/124,951

[22] Filed: Jul. 29, 1998

[51] Int. Cl.[7] .............................. H04M 3/00; H04M 3/42; H04M 11/00; H04Q 7/20; H04B 1/38

[52] U.S. Cl. ........................ 455/414; 455/419; 455/404; 455/560; 455/445

[58] Field of Search ................................... 455/414, 419, 455/404, 550, 560, 435, 422, 426, 466, 556, 566, 445, 557, 552, 553

[56] References Cited

U.S. PATENT DOCUMENTS

| | | | |
|---|---|---|---|
| D. 328,587 | 8/1992 | Arbisi | D12/187 |
| 4,677,653 | 6/1987 | Weiner et al. | 379/58 |
| 4,734,928 | 3/1988 | Weiner et al. | 379/59 |
| 4,747,122 | 5/1988 | Bhagat et al. | 379/57 |
| 4,833,702 | 5/1989 | Shitara et al. | 379/60 |
| 4,870,676 | 9/1989 | Lewo | 379/58 |
| 4,875,229 | 10/1989 | Palett et al. | 379/58 |
| 5,001,710 | 3/1991 | Gawrys et al. | 370/110.1 |
| 5,020,091 | 5/1991 | Krolopp et al. | 379/58 |
| 5,025,261 | 6/1991 | Ohta et al. | 342/357 |
| 5,093,827 | 3/1992 | Franklin et al. | 370/60.1 |
| 5,101,500 | 3/1992 | Marui | 455/33 |
| 5,113,427 | 5/1992 | Ryoichi et al. | 379/57 |
| 5,289,371 | 2/1994 | Abel et al. | 364/401 |
| 5,297,192 | 3/1994 | Gerszberg | 379/59 |
| 5,299,132 | 3/1994 | Wortham | 364/460 |
| 5,311,577 | 5/1994 | Madrid et al. | 379/93 |
| 5,325,424 | 6/1994 | Grube | 379/94 |
| 5,334,974 | 8/1994 | Simms et al. | 340/990 |
| 5,371,534 | 12/1994 | Dagdeviren et al. | 348/14 |
| 5,398,190 | 3/1995 | Wortham | 364/460 |
| 5,428,608 | 6/1995 | Freeman et al. | 370/60.1 |
| 5,428,666 | 6/1995 | Fyfe et al. | 379/58 |
| 5,437,053 | 7/1995 | Sawa et al. | 455/33.1 |
| 5,442,806 | 8/1995 | Barber et al. | 455/33.1 |

(List continued on next page.)

FOREIGN PATENT DOCUMENTS

| | | |
|---|---|---|
| 0 812 120 A2 | 10/1997 | European Pat. Off. ............... 455/414 |
| 0 814 447 | 12/1997 | European Pat. Off. ..... G08G 1/0968 |
| 0812120 A2 | 12/1997 | European Pat. Off. ......... H04Q 7/32 |
| 2 221 113 | 1/1990 | United Kingdom ............. G01S 5/00 |
| 2283350 | 5/1995 | United Kingdom ............. H04B 5/04 |
| 2292857 | 8/1995 | United Kingdom ............. H04B 1/08 |
| 8202448 | 7/1982 | WIPO ............................ G08B 19/00 |
| WO 96/07110 | 3/1996 | WIPO ................................ G01S 5/14 |
| WO 97/34431 | 9/1997 | WIPO ............................. H04Q 7/22 |
| WO 98/06227 | 2/1998 | WIPO ............................. H04Q 7/22 |
| WO 99/12367 | 3/1999 | WIPO ............................. H04Q 7/24 |

OTHER PUBLICATIONS

PCT Search Report in International Application No. PCT/US 99/17253, dated Mar. 14, 2000, 6 pages.

PCT Search Report in International Application No. PCT/US 99/17255, dated Nov. 22, 1999, 7 pages.

PCT Search Report in International Application No. PCT/US 99/17256, dated Jan. 11, 2000, 7 pages.

*Primary Examiner*—Dwayne D. Bost
*Assistant Examiner*—Raymond Persino
*Attorney, Agent, or Firm*—Baker Botts L.L.P.

[57] ABSTRACT

A communication system includes mobile units, a network switching center, and service centers to provide a variety of enhanced services to the mobile units. In one embodiment, a service center communicates menu data to a mobile unit using a voice network. The mobile unit displays at a user interface menu options generated in response to the menu data communicated by the service center. Selecting a menu option at the user interface enables a function associated with traditional or enhanced services.

31 Claims, 13 Drawing Sheets

| CALL TYPE | TABLE NUMBER |
|---|---|
| EMERGENCY SERVICES | |
|   POLICE DEPARTMENT | 322a |
|   FIRE DEPARTMENT | 322b |
|   HOSPITALS | 322c |
|   ⋮ | ⋮ |
| ROADSIDE ASSISTANCE | |
|   TOWING SERVICES | 324a |
|   TAXI/SHUTTLE SERVICES | 324b |
|   CAR DEALERSHIPS | 324c |
|   ⋮ | ⋮ |
| INFORMATION SERVICES | |
|   NEWS AGENCIES | 326a |
|   WEATHER BUREAUS | 326b |
|   ENTERTAINMENT SERVICES | 326c |
|   TRAVEL SERVICES | |
|   TRAFFIC REPORTERS | |
|   FINANCIAL INSTITUTIONS | |
|   ⋮ | ⋮ |
| OTHER | |

U.S. PATENT DOCUMENTS

| | | | |
|---|---|---|---|
| 5,448,286 | 9/1995 | Decaesteke et al. | 348/17 |
| 5,467,390 | 11/1995 | Brankley et al. | 379/229 |
| 5,479,482 | 12/1995 | Grimes | 379/59 |
| 5,504,482 | 4/1996 | Schreder | 340/995 |
| 5,513,251 | 4/1996 | Rochkind et al. | 379/93 |
| 5,530,736 | 6/1996 | Comer et al. | 379/58 |
| 5,533,108 | 7/1996 | Harris et al. | 379/201 |
| 5,539,810 | 7/1996 | Kennedy, III et al. | 379/59 |
| 5,543,789 | 8/1996 | Behr et al. | 340/995 |
| 5,550,905 | 8/1996 | Silverman | 379/142 |
| 5,566,224 | 10/1996 | Ul Azam et al. | 455/550 |
| 5,625,668 | 4/1997 | Loomis et al. | 379/58 |
| 5,627,547 | 5/1997 | Ramaswamy et al. | 342/357 |
| 5,652,707 | 7/1997 | Wortham | 364/460 |
| 5,686,910 | 11/1997 | Timm et al. | 340/988 |
| 5,712,899 | 1/1998 | Pace, II | 379/58 |
| 5,918,172 | 6/1999 | Saunders et al. | 455/404 |
| 6,014,569 | 1/2000 | Bottum | 455/466 |

| AUDIO MODES |
|---|
| 62a — PLAY MODE |
| 62b — RECORD MODE |
| 62c — VOICE RECOGNITION MODE |
| 62d — CALL SETUP MODE |
| 62e — AUDIO TEST CALL SETUP MODE |
| 62f — RING MODE |
| 62g — AUDIO TEST RING MODE |
| 62h — HANDSFREE VOICE MODE |
| 62i — HANDSFREE VOICE DTMF DETECTION MODE |
| 62j — HANDSFREE VOICE DTMF TRANSMISSION MODE |
| 62k — HANDSFREE VOICE SERVICE CENTER RECORD MODE |
| 62m — HANDSFREE VOICE SERVICE CENTER/MOBILE UNIT RECORD MODE |
| 62n — HANDSFREE VOICE MOBILE UNIT PLAY MODE |
| 62o — HANDSFREE VOICE SERVICE CENTER PLAY MODE |
| 62p — HANDSET VOICE MODE |
| 62q — HANDSET DTMF DETECTION MODE |
| 62r — HANDSET DTMF TRANSMISSION MODE |
| 62s — HANDSET VOICE SERVICE CENTER/MOBILE UNIT RECORD MODE |

| CALL TYPE | TABLE NUMBER |
|---|---|
| EMERGENCY SERVICES | |
|    POLICE DEPARTMENT | 322a |
|    FIRE DEPARTMENT | 322b |
|    HOSPITALS | 322c |
|    ⋮ | ⋮ |
| ROADSIDE ASSISTANCE | |
|    TOWING SERVICES | 324a |
|    TAXI/SHUTTLE SERVICES | 324b |
|    CAR DEALERSHIPS | 324c |
|    ⋮ | ⋮ |
| INFORMATION SERVICES | |
|    NEWS AGENCIES | 326a |
|    WEATHER BUREAUS | 326b |
|    ENTERTAINMENT SERVICES | 326c |
|    TRAVEL SERVICES | ⋮ |
|    TRAFFIC REPORTERS | |
|    FINANCIAL INSTITUTIONS | |
|    ⋮ | |
| OTHER | ⋮ |

FIG. 7A

| MIN/ESN 410 | VIN 412 | LOCATION 406 | SERVICE CENTER ID (POLICE) 408 |
|---|---|---|---|
| 099-880-1234 | – | PLANO, TEXAS | 12 |
| 214-555-1212 | 8163549QVR693 | DALLAS, TEXAS | 10 |
| – | 445ABC692XYZ | HOUSTON, TEXAS | 39 |
| ⋮ | ⋮ | ⋮ | ⋮ |

FIG. 7B

| MIN/ESN 410 | VIN 412 | LOCATION 406 | SERVICE CENTER ID (FIRE) 408 |
|---|---|---|---|
| 099-880-1234 | – | PLANO, TEXAS | 44 |
| 214-555-1212 | 8163549QVR693 | DALLAS, TEXAS | 16 |
| – | 445ABC692XYZ | HOUSTON, TEXAS | 41 |
| ⋮ | ⋮ | ⋮ | ⋮ |

FIG. 7C 322c, 404

| MIN/ESN 410 | VIN 412 | LOCATION 406 | SERVICE CENTER ID (HOSPITAL) 408 |
|---|---|---|---|
| 018-776-4321 | - | PORTLAND, MAINE | 22 |
| 216-459-7236 | 71745QRTS713 | DETROIT, MICHIGAN | 88 |
| 451-1034-5696 | - | CLEVELAND, OHIO | 08 |
| ⋮ | ⋮ | ⋮ | ⋮ |

FIG. 8A 324a, 404

| MIN/ESN 410 | VIN 412 | LOCATION 406 | SERVICE CENTER ID (TOWING) 408 |
|---|---|---|---|
| 099-880-1234 | - | PLANO, TEXAS | 14 |
| 214-555-1212 | 8163549QVR693 | DALLAS, TEXAS | 36 |
| - | 445ABC692XYZ | HOUSTON, TEXAS | 42 |
| ⋮ | ⋮ | ⋮ | ⋮ |

FIG. 8B 324b, 404

| MIN/ESN 410 | VIN 412 | LOCATION 406 | SERVICE CENTER ID (TAXI/SHUTTLE) 408 |
|---|---|---|---|
| 099-880-1234 | - | PLANO, TEXAS | 17 |
| 214-555-1212 | 8163549QVR693 | DALLAS, TEXAS | 23 |
| - | 445ABC692XYZ | HOUSTON, TEXAS | 89 |
| ⋮ | ⋮ | ⋮ | ⋮ |

FIG. 8C 324c, 404

| MIN/ESN 410 | VIN 412 | LOCATION 406 | SERVICE CENTER ID (CAR DEALERSHIP) 408 |
|---|---|---|---|
| 099-880-1234 | - | PLANO, TEXAS | 99 |
| 099-880-1234 | - | DALLAS, TEXAS | 98 |
| - | 445ABC692XYZ | DALLAS, TEXAS | 91 |
| ⋮ | ⋮ | ⋮ | ⋮ |

| MIN/ESN 410 | VIN 412 | LOCATION 406 | SERVICE CENTER ID (NEWS) 408 |
|---|---|---|---|
| 099-810-1234 | – | DALLAS, TEXAS | 26 |
| 099-810-1234 | – | HOUSTON, TEXAS | 27 |
| – | 445ABC692XYZ | HOUSTON, TEXAS | 27 |
| ⋮ | ⋮ | ⋮ | ⋮ |

| MIN/ESN 410 | VIN 412 | LOCATION 406 | SERVICE CENTER ID (WEATHER) 408 |
|---|---|---|---|
| 099-810-1234 | – | DALLAS, TEXAS | 35 |
| 099-810-1234 | – | HOUSTON, TEXAS | 37 |
| – | 445ABC692XYZ | HOUSTON, TEXAS | 37 |
| ⋮ | ⋮ | ⋮ | ⋮ |

| MIN/ESN 410 | VIN 412 | LOCATION 406 | SERVICE CENTER ID (ENTERTAINMENT) 408 |
|---|---|---|---|
| 099-810-1234 | – | DALLAS, TEXAS | 45 |
| – | 445ABC692XYZ | DALLAS, TEXAS | 45 |
| – | 445ABC692XYZ | HOUSTON, TEXAS | 46 |
| ⋮ | ⋮ | ⋮ | ⋮ |

| SERVICE CENTER ID 408 | VOICE ACCESS PARAMETERS 420 | DATA ACCESS PARAMETERS 422 |
|---|---|---|
| 01 | 800-555-1212 | node @ NETWORK |
| 02 | 617-123-4567 | www.sp02.com |
| 12 | truck/line ID | – |
| 16 | – | 800-999-8888 |
| 17 | ext. 543 | – |
| ⋮ | ⋮ | ⋮ |
| 103 | – | 42.137.205.12 |
| 106 | 214-987-6543 | channel group/channel |
| 110 | 001-4329 | VPI/VCI |

SYSTEM AND METHOD FOR PROVIDING MENU DATA USING A COMMUNICATION NETWORK

CROSS REFERENCE TO RELATED APPLICATIONS

This application is related to pending U.S. patent application Ser. No. 09/126,018, filed on Jul. 29, 1998, by William C. Kennedy, III et al., and entitled "System and Method for Providing Directions Using a Communication Network," and pending U.S. patent application Ser. No. 09/126,041, filed on Jul. 29, 1998, by William C. Kennedy, III et al., and entitled "System and Method for Routing a Call Using a Communications Network."

TECHNICAL FIELD OF THE INVENTION

This invention relates generally to the field of telecommunications, and more particularly to a system and method for communicating over a communication network using a user interface.

BACKGROUND OF THE INVENTION

With the proliferation of sophisticated communication technology, consumers demand a wider range of communication solutions to meet their increasing needs. Many of these technologies may not be adaptable to a mobile environment. For example, existing call center technology supports communication sessions to deliver customer services. Typically, a customer engages in a communication session to receive a predefined service. A customer may dial a 1-800 number to place an order for clothing with a mail-order organization, to trade stocks or mutual funds, or to perform some other suitable transaction. Often these communication sessions include a conversation with a live operator that can access data related to the service. However, existing communication technology does not enable access to these customer services by an operator of a vehicle, such as a car, truck, boat, or airplane. In particular, these technologies do not support a user interface that is configurable in a mobile environment to enable access to a variety of local or remote services in an integrated communication system.

SUMMARY OF THE INVENTION

In accordance with the present invention, a communication system and method are provided that substantially eliminate or reduce disadvantages or problems associated with previously developed communication systems and methods. In particular, the present invention provides a system and method for providing menu data using a communication network.

In one embodiment of the present invention, a communication system includes a server coupled to a communication network. The server communicates menu data using the communication network. The system further includes a mobile unit coupled to the communication network. The mobile unit includes a user interface that displays a number of menu options specified by the menu data communicated by the server.

Another embodiment of the present invention is a communication method that includes communicating menu data from a server using a communication network. The method continues by receiving the menu data at a mobile unit coupled to the communication network. The method concludes by displaying at a user interface of the mobile unit a number of menu options specified by the menu data.

Yet another embodiment of the present invention is a mobile unit coupled to a communication network. The mobile unit includes a processor that receives menu data communicated by a remote server using the communication network. The mobile unit further includes a user interface coupled to the processor. The user interface displays a number of menu options specified by the menu data.

Technical advantages of the present invention include an arrangement of mobile units, one or more Technical advantages of the present invention include an arrangement of mobile units, one or more Network Switching Centers (NSCs), and one or more service centers. The mobile units direct requests for enhanced services to the NSC which may then determine an appropriate service center to satisfy the request. In particular, the NSC selects an appropriate service center in response to information communicated in the service message and information stored in profile tables at the NSC. The service message generally identifies the mobile unit, the class of services requested, the location of the mobile unit, the priority level of the message, and any other information that may be used by the NSC to route the call from the mobile unit to the appropriate service center, as well as by the service center to provide the requested service. The profile tables include information that relates individual or groups of mobile units to associated service centers and access information to establish a voice path, data path, or both to the selected service center. The components of the communication system combine to establish a communication session between a mobile unit and the selected service center. The selected service center provides enhanced services to the mobile unit during the communication session to satisfy the request.

Other important technical advantages of the present invention include the adaptation of the invention to provide a variety of enhanced services in a mobile environment. In a particular embodiment, mobile units are associated with cars, trucks, boats, barges, airplanes, cargo holders, persons or other mobile items that may desire a selection of services. These services may include emergency services, roadside assistance, information services (e.g., directions, news and weather reports, financial quotes, etc.), or other services. The NSC maintains information to relate and provide these services upon request by the mobile units.

Further technical advantages of the present invention include a user interface at the mobile unit having a display and a number of buttons. In one embodiment, the display presents a menu structure having one or more levels of static or dynamic menu options that facilitate requesting enhanced services from the service centers, monitoring and controlling sensors and actuators at the mobile unit, and performing any of the unique features and functions of the mobile unit. The service centers may also download to the mobile unit menu data specifying new or updated menu structures and/or associated menu options for available enhanced services. The operator of the mobile unit may navigate through and select menu options using the buttons. In a particular embodiment, portions of the user interface are embodied in a rearview mirror of a vehicle associated with the mobile unit. The display is presented through the glass of the mirrored surface while the buttons are arranged strategically about the perimeter of the mirrored surface.

Still other technical advantages of the present invention include the use of an audio recorder to store downloaded data in an appropriate format at the mobile unit. In one embodiment, the audio recorder stores different segments of a set of directions downloaded by a service center. An operator of the mobile unit may manually play back each segment of the directions in succession. Alternatively, a processor and a GPS device associated with the mobile unit may automatically play back each segment of the directions when the mobile unit is in near proximity to the location at which the next step of the directions is to be executed. In another embodiment, the audio recorder stores and plays back other downloaded data, such as voice mails, e-mails, voice notes, or any other suitable communication. Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIG. 3 illustrates a number of different audio modes used by the communication system;

FIG. 6 illustrates an exemplary embodiment of a code table maintained by the NSC;

FIGS. 7A–7C illustrate exemplary embodiments of profile tables maintained by the NSC;

FIGS. 8A–8C illustrate exemplary embodiments of profile tables maintained by the NSC;

FIGS. 9A–9C illustrate exemplary embodiments of profile tables maintained by the NSC;

FIG. 10 illustrates an exemplary embodiment of a service table maintained by the NSC;

DETAILED DESCRIPTION OF THE INVENTION

Figure 1:
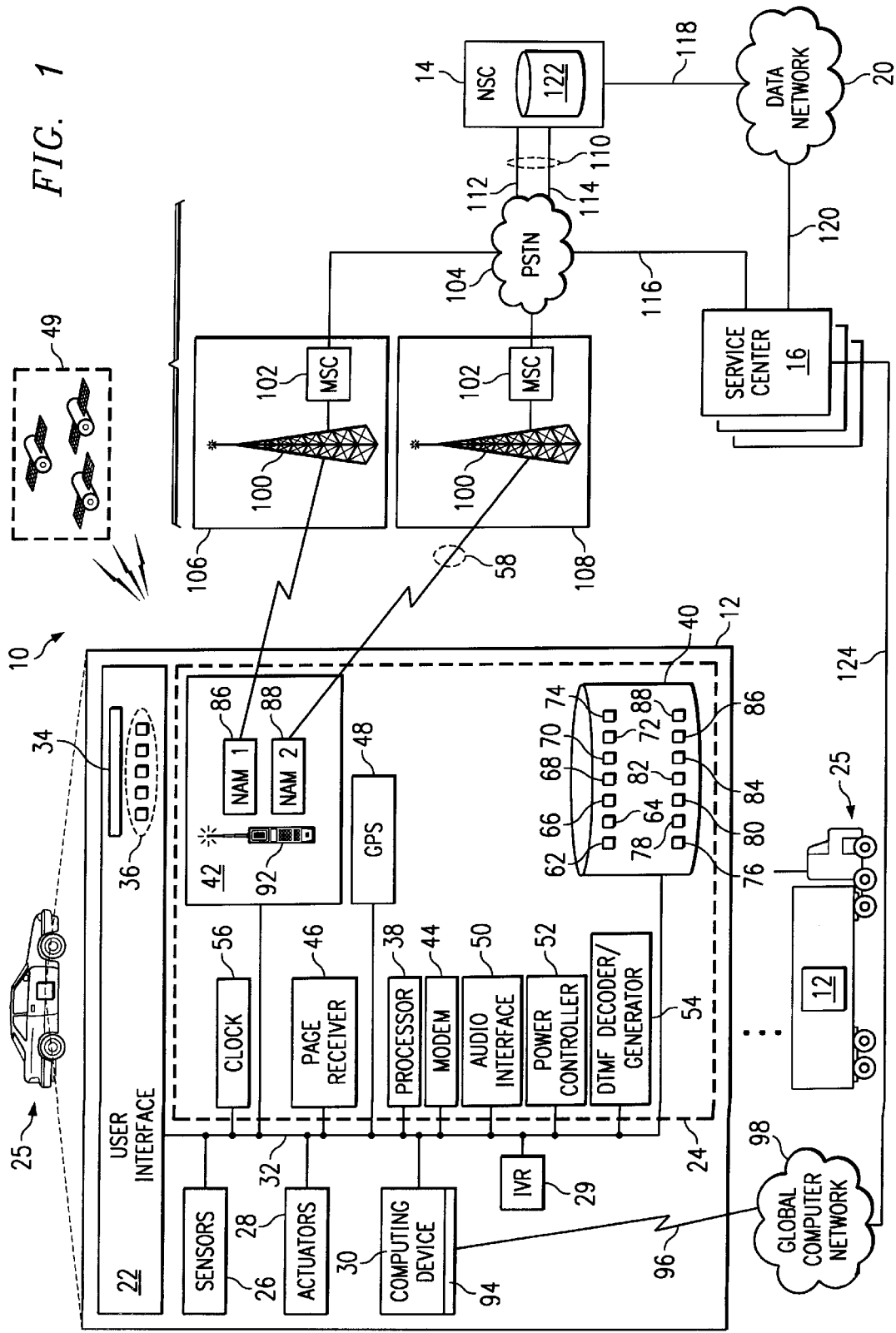
FIG. 1 illustrates a communication system that includes mobile units, a network switching center (NSC), and service centers.

FIG. 1 illustrates a communication system 10 that includes a number of mobile units 12 coupled to a network switching center (NSC) 14 and a number of service centers 16 by a voice network 18 and, optionally, a data network 20. Each mobile unit 12 includes at least a user interface 22 and a platform 24. In one operation, interface 22 and platform 24 enable control of the local features and functions available at mobile unit 12. In another operation, interface 22 and platform 24 enable mobile unit 12 to issue a request for enhanced services from service centers 16 using NSC 14. NSC 14 accesses stored profile tables using a service message issued by mobile unit 12 to select an appropriate service center 16. The selected service center 16 provides enhanced services to mobile unit 12 to satisfy the request.

Mobile units 12 may be hand-held or portable devices associated with any mobile items 25, such as cars, trucks, boats, barges, airplanes, cargo holders, persons, or other items that are movable or mobile. Mobile unit 12 includes user interface 22 that couples to platform 24, sensors 26, actuators 28, interactive voice response (IVR) unit 29, and computing devices 30 using a communication bus 32. Mobile unit 12 contemplates any arrangement, processing capability, memory allocation, or task assignment between user interface 22, platform 24, sensors 26, actuators 28, IVR unit 29, and computing devices 30.

User interface 22 includes a display 34 and a variety of buttons 36. Interface 22 enables local access to platform 24, sensors 26, actuators 28, and computing devices 30, and/or remote access to service centers 16 via NSC 14 using network 18 and, optionally, network 20.

An operator of mobile unit 12 may activate a button 36 to perform any contemplated feature or function of user interface 22 and/or mobile unit 12, such as, for example, to request a desired service from a particular service center 16, or to monitor and control sensors 26, actuators 28, and/or computing devices 30.

Platform 24 comprises a communications platform that supports multiple applications that operate locally at mobile unit 12 and remotely using voice network 18 and NSC 14. Platform 24 includes a processor 38 that is coupled to a memory 40, a cellular transceiver 42, a modem 44, a pager receiver 46, a global positioning satellite (GPS) device 48, an audio interface 50, a power controller 52, a dual tone multifrequency (DTMF) decoder/generator 54, and a clock 56.

Processor 38 comprises a central processing unit (CPU) that manages the communicating, processing, locating, interfacing, and reporting features of mobile unit 12. Processor 38 operates and controls the other components of platform 24, and interprets and responds to all input events. For example, processor 38 detects the activation of buttons 36 at interface 22 and, in one embodiment, generates an appropriate service message 58 for communication to NSC 14. In another operation, processor 38 gathers various pieces of information from sensors 26, memory 40, cellular transceiver 42, pager receiver 46, GPS device 48, or other sources, and integrates this information into a data report for transmission over network 18. The data report can be time stamped using time generated by clock 56.

Memory 40 comprises random access memory (RAM), flash memory, read-only memory (ROM), CD-ROM, removable memory devices, or any other device that allows storage or retrieval of data. Processor 38 and memory 40 may be separate or integral components of mobile unit 12. Memory 40 contains programs, maps, databases, and other information used by mobile unit 12 to perform its functions. For example, memory 40 stores audio modes 62, described in detail with reference to FIG. 3, used by mobile unit 12 to perform its unique audio functions. Memory 40 stores message formats 62 used to generate service message 58 and protocols 64 used to communicate service message 58 to NSC 14. Memory 40 stores programs used by processor 38, such as voice recognition software 68, audio recorder software 70 and associated audio A recordings 72, speech synthesis software 74 and associated speech synthesis database 76, autonomous registration software 78, and any other program or application used by processor 38 or any other component of mobile unit 12. Memory 40 further stores configuration data 80, data logs 82, and menu structures 84. In one embodiment, memory 40 stores number assignment modules (NAMs), such as NAM 86 and NAM 88, to support varying classes of service provided by network 18. For example, NAM 86 may support personal services while NAM 88 may support enhanced services.

Configuration data 80 comprise data that may be configured by NSC 14 and/or service providers 16. Configuration data 80 may include formats for menu structures 84. Configuration data 80 may also include phone numbers associated with NSC 14 dialed by platform 24 to initiate a communication session. Furthermore, configuration data 80 may include system identification (SID) information, such as, for example, SID tables that identify those cellular systems with which mobile unit 12 may register and operate. Moreover, configuration data 80 may include any configuration standards, such as delay codes and interval codes, that regulate the operation of mobile unit 12.

Data logs 82 comprise statistics reports regarding each communication session established using enhanced services NAM 88. This information is time stamped using clock 56, and describes when the call was initiated, when the connection to NSC 14 was made, how much data was sent and received, when the call switched to voice mode, switched back to data mode, and/or when the call was completed. Each entry may also include the GPS position and current SID. Furthermore, failed call attempts may be logged with the reason for the failure. In one embodiment, memory 40 has enough storage capacity for at least one hundred communication statistics reports. These statistics reports may be transmitted during any data handshake with NSC 14. Once the statistics reports have been sent to NSC 14, they may be deleted from memory 40. Data logs 82 may be implemented as a circular buffer, where the oldest entries are replaced with newer entries when the buffer is full.

Menu structures 84 comprise a hierarchical arrangement of static or dynamic menu options that facilitate requesting enhanced services from service centers 16, monitoring and/or controlling the various components of mobile unit 12, and performing any of the features and functions of mobile unit 12. In one embodiment, the menu options enable selected functions associated with enhanced services, such as emergency services, roadside assistance, and information services. Service centers 16 may download to mobile unit 12 menu data specifying new or updated menu structures 84 and/or the associated menu options for enhanced services offered to mobile unit 12. Menu structures 84 and the associated menu options may be presented to an operator of mobile unit 12 using display 34 of user interface 22.

Cellular transceiver 42 includes components that provide mobile voice communications, including multiple NAM registration, paging control, autonomous registration control, handsfree communication, and the remote programmability of mobile identification numbers (MINs). In one embodiment, transceiver 42 retries failed communication attempts with NSC 14 at suitable intervals defined by the interval codes stored in configuration data 80. In this embodiment, configuration data 80 also specifies a number of retry attempts to be made by transceiver 42 until a call is placed to a local "911" number.

Transceiver 42 may include a handset 92 and a program memory to store data and instructions for operation. Handset 92 includes transmit and receive circuitry that interfaces with processor 38 so that all key presses may be interpreted and processed as, for example, DTMF tones. In a particular embodiment, transceiver 42 may register with network 18 using either of NAMs 86 and 88 to support inbound and/or outbound communication. For example, NAM 88 may be designated for providing enhanced services, while NAM 86 provides traditional cellular services. Although transceiver 42 is described with reference to NAMs 86 and 88, it should be understood that transceiver 42 supports communication with any number of designated or traditional NAMs operating individually or simultaneously.

Modem 44 may comprise any suitable remote access device that supports communication with NSC 14 using any suitable communication protocol. In one embodiment, modem 44 supports simultaneous voice and data communications over voice network 18 and/or global computer network 98.

Pager receiver 46 includes data transmission and reception circuitry capable of transmitting and receiving paging signals over a typical paging network. In one embodiment, pager receiver 46 receives a page specifying a particular NAM, such as personal services NAM 86 or enhanced services NAM 88. In response, transceiver 42 registers with voice network 18 using the specified NAM. This technique for specifying to mobile unit 12 a particular NAM in a paging signal allows transceiver 42 to receive calls using multiple NAMs without requiring the transceiver to register each NAM simultaneously.

GPS device 48 generates information on the geographic location of mobile unit 12. In one embodiment, GPS device 48 generates latitude, longitude, and altitude position information at suitable intervals defined by the interval codes stored in configuration data 80. In particular, a plurality of orbiting satellites, represented by satellites 49, transmit pseudorange information and have determinable orbits such that the earth location of mobile unit 12 may be ascertainable by triangulation of these pseudoranges, or by other well-known positioning techniques.

Audio interface 50 comprises suitable software and hardware to provide source-to-destination routing and switch control of various audio signals operating within communication system 10. Audio interface 50 further comprises suitable circuitry to filter and amplify the audio signals to provide acceptable operation in various environments, including both the automotive and heavy duty truck environments. In one embodiment, audio interface 50 may mute a radio associated with vehicle 25 so that the audio signals may be heard by the operator. Moreover, processor 38 and audio interface 50 operate to implement the various audio modes 62 stored in memory 40.

Power controller 52 comprises a power supply and associated power control circuitry. The power supply provides a constant supply voltage from the battery associated with vehicle 25, and an internal battery for critical data retention when no vehicle battery is present. The power control circuitry provides input power filtering, limiting, protection, monitoring, switching, and control to enable mobile unit 12 to remain powered up even if the ignition associated with vehicle 25 is lost. Upon the loss of ignition, platform 24 will wait until a configurable power down delay, stored in configuration data 80, has elapsed and all processing is complete, including any calls in progress, prior to powering itself down. In one embodiment, power controller 52 supports the ability to place transceiver 42 in a low power state even when mobile unit 12 is powered down. In the low power state, transceiver 42 simply monitors the overhead channel for pages and orders. Upon the receipt of a page directed to one of the supported NAMs, transceiver 42 wakes up mobile unit 12, and responds to the page.

DTMF decoder/generator 54 comprises suitable software and hardware that enables platform 24 to process calls communicated over voice network 18 using DTMF techniques. In particular, the DTMF decoder enables platform 24 to receive DTMF encoded messages over voice network 18. The DTMF generator enables platform 24 to send DTMF encoded messages over voice network 18. This technique is advantageous since it facilitates sending data during a voice call.

Clock 56 provides both time keeping and alarm capabilities to platform 24. Service message 58, data logs 82, and any other communication or report may be time stamped using clock 56. An alarm associated with clock 56 may be used to signal mobile unit 12 to execute a particular function, such as initiating a communication sequence with NSC 14. In addition, an alarm output signal may be used as an input to the power supply to power up mobile unit 12 when it is time to execute a particular function. Clock 56 has constant power at all times when mobile unit 12 is connected to the vehicle power. In addition, clock 56 may be backed by an internal battery, contained in the power supply, for maintaining accurate clock time during periods when mobile unit 12 is not connected to vehicle power.

Sensors 26 may include engine sensors, trailer sensors, personal medical sensors, airbag deployment sensors, alarms, temperature gauges, accelerometers, security sensors, onboard positioning sensors, or other sensors that generate information on the status or condition of mobile unit 12, or its operator. Actuators 28 may include security alarm devices, door lock/unlock devices, engine cutoff devices, or any other actuators that can receive actuator commands associated with an enhanced service in system 10 and implement them on a mobile item associated with mobile unit 12.

Interactive voice response (IVR) unit 29 comprises suitable software and hardware components that interact with processor 38 to execute voice recognition software 68. In one embodiment, an operator of mobile unit 12 may activate IVR unit 29 to navigate through multiple levels of menu options associated with menu structures 84 using voice recognition techniques. In this embodiment, the operator issues verbal commands to scroll through and select particular menu options. For example, an operator of mobile unit 12 may issue a verbal command to select a particular enhanced service offered by a service center, to place a traditional cellular services call, to monitor/control a component of mobile unit 12, or generally to perform any other feature or function of mobile unit 12, using voice recognition techniques.

Computing device 30 comprises a hand-held or laptop computer, a personal digital assistant (PDA), a personal information manager (PIM), or any other portable computing device. Device 30 exchanges information with the various components of mobile unit 12. In particular, device 30 interfaces with processor 38 using bus 32 and appropriate interfacing software to download and upload data regarding user interface 22, platform 24, sensors 26, actuators 28, or any other component of mobile unit 12. In one embodiment, device 30 uses a network interface 94 to maintain an external link 96 that provides communication capabilities between mobile unit 12 and a global computer network 98, such as the Internet. Network interface 94 comprises a modem, a remote access device, or any other suitable collection of hardware and/or software to provide communication capability between device 30 and network 98. By interfacing computing device 30 with processor 38, mobile unit 12 facilitates an exchange of information with an external and portable source.

Communication bus 32 may be a wireline network, a wireless network, or a combination of wireline and wireless networks that couple the various components of mobile units 12. In one embodiment, bus 32 may comprise a local area network (LAN).

Mobile units 12 couple to NSC 14 using voice network 18. Voice network 18 comprises cell transmitter sites 100, mobile switching centers (MSCs) 102, and the various components of the public switched telephone network (PSTN) 104. Voice network 18 may also include any other suitable land-based or satellite-based transmitting and receiving components. Voice network 18 generally comprises any suitable number and collection of telecommunication hardware and associated software that provides a voice path between mobile unit 12 and NSC 14. In one embodiment, voice network 18 comprises a first voice network 106 that supports traditional voice services, such as, for example, sending and receiving voice calls, and a second voice network 108 that supports enhanced services provided by service centers 16. Networks 106 and 108 are depicted as separate components in FIG. 1 for convenience and illustrative purposes only, and it should be understood that the present invention contemplates networks 106 and 108 as the same or different networks.

Voice paths 110 couple voice network 18 to NSC 14. Voice paths 110 may be individual lines, multiple lines, trunks, multiple trunks, or any other suitable collection of lines, trunks, and/or other suitable paths to support one or more voice paths. In one embodiment, incoming voice path 112 establishes voice communication between mobile unit 12 and NSC 14, and outgoing voice path 114 establishes communication between NSC 14 and service center 16. For example, NSC 14 may couple to service center 16 using a voice path that includes outgoing voice path 114, PSTN 104, and voice path 116. Although FIG. 1 illustrates NSC 14 coupled to a service center 16 using PSTN 104 and voice paths 114 and 116, it should be understood that NSC 14 may couple to service centers 16 using a dedicated voice path separate from PSTN 104. In a particular embodiment, NSC 14 may also couple to service center 16 using a data path that includes data path 118, data network 20, and data path 120.

NSC 14 comprises a communication server, an access server, a data server, a telephony server, and/or any other suitable server environment that maintains a database 122 and facilitates communication with mobile unit 12 and service centers 16. Database 122 contains geographical information such as maps and geographical coordinates; information on customer profiles, mobile units 12, service centers 16, and pending messages to be communicated between mobile units 12 and service centers 16; and any other information suitable for use in communication system 10. The contents of database 122 are described in more detail below with reference to FIGS. 4–10. Furthermore, NSC 14 may locally perform some or all of the functions normally performed by service center 16 using an interactive voice response unit.

Data network 20 may include hardware and software to establish a dedicated data path between NSC 14 and service center 16, using frame relay, X.25, TCP/IP, or any other suitable dedicated communication protocol. Alternatively, data network 20 may include hardware and software to implement a non-dedicated, switched, or dial-up data path between NSC 14 and service center 16. Data network 20 and data paths 118 and 120 may be wireline, wireless, or a combination of wireline and wireless technologies. For example, data network 20 may comprise a portion of PSTN 104 that establishes a dial-up modem connection that is separate from voice path 114. In a particular embodiment, the data path established by data network 20 and data paths 118 and 120 provide a sufficiently small transmission time to enable data associated with the communication session to arrive at service center 16 simultaneously or in advance of the call over the voice path established by PSTN 104 and voice paths 114 and 116.

Although networks 20 and 98 are illustrated separately, it should be understood that networks 20 and 98 may comprise the same or different networks. Furthermore, voice network 18, data network 20, and global computer network 98 may be referred to collectively or individually as a communication network.

Service centers 16 comprise communication servers, access servers, data servers, telephony servers, and/or any other suitable server environments associated with organizations, personnel, businesses, or any other suitable provider of enhanced services. Service centers 16 include the appropriate hardware and software to conduct communication sessions with mobile unit 12, and to provide a variety of voice/data services to mobile unit 12. The communication sessions may comprise voice sessions using voice network 18, data sessions using voice network 18, or both. Generally, services offered by service centers 16 include emergency services, roadside assistance, and a variety of information services. In one embodiment, service centers 16 are coupled to global computer network 98 using link 124. In this embodiment, the communication session may comprise a communication session using network 98.

In operation, user interface 22 and platform 24 of mobile unit 12 enable a variety of features and functions available to mobile unit 12. In general, user interface 22 and platform 24 enable local access to platform 24, sensors 26, actuators 28, computing devices 30, and any other component of mobile unit 12. User interface 22 and platform 24 further enable remote access to service centers 16 via NSC 14 using network 18 and, optionally, networks 20 or 98.

An operator of mobile unit 12 may navigate through multiple levels of menu options associated with menu structures 84 using interface 22 to access various components of mobile unit 12. In particular, an operator of mobile unit 12 may monitor, control, configure, or activate any of the components of platform 24, sensors 26, actuators 28, or any other component of mobile unit 12, using interface 22. For example, user interface 22 and platform 24 facilitate local operations, such as monitoring on-board diagnostics of mobile unit 12, enabling/disabling a security mode associated with vehicle 25, and enabling/disabling autonomous registration by cellular transceiver 42.

User interface 22 and platform 24 also facilitate remote operations, such as placing and receiving traditional cellular calls and/or enhanced services calls. In one example, mobile unit 12 generates a request for services that is transmitted to NSC 14 in a voice call, and routed to an appropriate service center 16 to establish a communication session. In another example, user interface 22 and platform 24 establish a communication session with service centers 16 using computing device 30 and global computing network 98. Mobile unit 12, NSC 14, and service centers 16 may transfer data during these communication sessions. The transfer of data may include downloading to mobile unit 12 configuration data 80, menu data specifying menu structures 84 and/or menu options, directions, or any other requested data. The transfer of data may also include uploading to NSC 14 and/or service centers 16 data logs 82, menu structures 84, or any other data generated at mobile unit 12.

In one operation, user interface 22 and platform 24 enable an operator of mobile unit 12 to perform diagnostic tests on sensors 26, actuators 28, computing devices 30, bus 32, or any other suitable component of mobile unit 12. In particular, the operator may navigate through various menu structures 84 and select a menu option associated with performing diagnostic tests, using interface 22. Processor 38 executes the diagnostic tests on the selected components and generates diagnostic results that may be stored in memory 40 and/or presented to the operator using interface 22. In response to the diagnostic results, the operator may reconfigure specifications, perform maintenance, or, in some other way operate on the components of mobile unit 12.

In another operation, an operator of mobile unit 12 may enable and disable a security mode of vehicle 25 associated with mobile unit 12 using interface 22 and platform 24. In particular, upon detecting that the ignition of vehicle 25 is off, platform 24 requests a personal identification number, a security password, or some other security code from the operator of mobile unit 12, using interface 22. The next time the operator attempts to turn on the ignition of vehicle 25, mobile unit 12 requests input of the same security code. In one embodiment, the operator may not turn on the ignition until entering the proper security code. In another embodiment the operator may turn on the ignition but mobile unit 12 places an emergency services service message 58 unless the operator enters the proper security code. In this embodiment, mobile unit 12 automatically alerts the proper authorities and provides a location update and tracking information to aid in vehicle recovery.

In yet another operation, platform 24 disables autonomous registration by cellular transceiver 42 to ensure that all NAMs are registered in the current cellular system. In a particular embodiment, mobile unit 12 resides in an area serviced by an A side and a B side cellular system. In this embodiment, if mobile unit 12 is powering up for any reason other than the receipt of a page, platform 24 disables autonomous registration for all Number Assignment Modules (NAMs), and commands transceiver 42 to scan for the strongest signal channel on both the A side and B side cellular systems. When transceiver 42 has reported the signal channel information as requested, platform 24 determines which cellular system to operate on, and re-enables autonomous registration for the NAMs which are defined to support autonomous registration. In a particular embodiment, platform 24 re-enables autonomous registration for personal services NAM 86, while leaving it disabled for enhanced services NAM 88.

In addition, platform 24 and transceiver 42 detect vehicle 25 entering a new cellular system. If the cellular system has changed since the last known system, transceiver 42 autonomously registers all NAMs that have autonomous registration enabled. Platform 24 commands transceiver 42 to register those NAMs that have autonomous registration disabled. In this manner, mobile unit 12 ensures that all of the NAMs are registered in the correct system.

In another operation, mobile unit 12 generates a request for service in response to user interaction or an automatically triggered event. This request for service may be in the form of a service message 58 transmitted in a voice call placed by mobile unit 12 to NSC 14 using voice network 18. In particular, processor 38 of platform 24 generates service message 58 in response to the activation of one or more buttons 36, the activation of a sensor 26, verbal commands detected by voice recognition software 68 during communication with IVR unit 29, or any other suitable input event detected by processor 38. Service message 58 generally identifies mobile unit 12, the class of services requested, the location of mobile unit 12, the priority level of message 58, and any other information that may be used by NSC 14 to route the call from mobile unit 12 to the appropriate service center 16.

In one embodiment, processor 38 determines the priority level of message 58 based upon the nature of the input event. For example, a service message 58 generated in response to the activation of a button 36 may receive a standard priority level, or a non-priority status. Similarly, a service message 58 generated in response to the activation of a sensor 26 that detects non-emergency service needs may also receive a standard priority level, or a non-priority status. A service message 58 generated in response to the activation of a sensor 26 that detects an emergency situation, such as, for example, a car crash, receives an emergency priority level, or a priority status. A service message 58 having an emergency priority level may receive expedited service from NSC 14 and service centers 16. Furthermore, processor 38 may upgrade a service message 58 having a standard priority level to an emergency priority level where an emergency situation results after the original service message 58 was generated and/or communicated.

NSC 14 receives service message 58 and accesses information maintained in database 122 to determine the appropriate service center 16 to satisfy the request. In particular, NSC 14 parses service message 58 to identify and locate mobile unit 12, to determine the class of services requested by mobile unit 12, to determine the priority level of service message 58, and to identify any other pertinent data. Together with information retrieved from database 122, such as profile information regarding mobile unit 12 and its operator, and information retrieved from service message 58, NSC 14 determines the appropriate service center 16 with which to establish a communication session. For example, if service message 58 indicates a request for roadside assistance, then based on information specific to mobile unit 12, such as the position and vehicle type of mobile unit 12, NSC 14 accesses database 122 to determine the appropriate service center 16 to satisfy the request. Alternatively, an interactive voice response unit at NSC 14 may conduct a communication session with the operator of mobile unit 12 to request and receive a selection of one or more particular service centers 16.

NSC 14 then establishes a voice path (e.g. by initiating a voice call) with the selected service center 16 using PSTN 104 and voice paths 114 and 116 or, optionally, using a dedicated voice path separate from PSTN 104. In one embodiment, NSC 14 also communicates a data message to service center 16 using data network 20 and data paths 118 and 120. In another embodiment, NSC 14 communicates a data message to service center 16 using PSTN 104, and voice paths 114 and 116 using modems, DTMF techniques, and/or out-of-band signaling. For example, NSC 14 may forward to service center 16 a data message containing the history and specifications of mobile unit 12, the medical history of the occupants of mobile unit 12, the information provided by service message 58, and any other suitable information. Both the voice call and the data message from NSC 14 to service center 16 may include an identifier of mobile unit 12.

Service center 16 receives the voice call and the data message communicated by NSC 14. Upon establishing voice communication with service center 16, NSC 14 bridges or connects the original inbound call from mobile unit 12 with the outbound call to service center 16 to establish a voice path between mobile unit 12 and service center 16. Service center 16 may now conduct a communication session with mobile unit 12 to provide enhanced services using voice network 18. The communication session may include bidirectional voice and/or data communication between mobile unit 12, NSC 14, and service center 16.

In one embodiment, service center 16 toggles between conducting a voice session with mobile unit 12 on network 18 and conducting a data session with mobile unit 12 on network 18 to satisfy the request issued in service message 58. For example, a customer representative, an interactive voice response unit, or a combination of both, may conduct an interactive voice session with the operator of mobile unit 12 using voice network 18 to solicit selections of particular enhanced services offered by service center 16 and/or to provide the requested services to mobile unit 12. Before or after the voice session, service center 16 may conduct a data session with mobile unit 12 using DTMF techniques, in-band signaling, and/or out-of-band signaling with voice network 18 to download or upload data to satisfy the request for enhanced services. For example, in response to service message 58, service center 16 may download to mobile unit 12 directions, configuration data 80, menu data specifying menu structures 84 and/or menu options, e-mail or voice-mail messages, or any other suitable data to satisfy the request. In another example, NSC 14 and/or service center 16 may use network 18 to upload data generated by platform 24, such as configuration data 80, data logs 82, and menu structures 84.

NSC 14 may monitor the communication session between mobile unit 12 and service center 16 for billing purposes. For example, NSC 14 determines the appropriate billing for a particular communication session based upon the identity of mobile unit 12, the particular service center 16 providing services, the particular services offered by that service center 16, the duration of the communication session, and any other factor suitable for billing purposes.

In another operation, service centers 16 may broadcast a data message to a number of mobile units 12 irrespective of a current communication session with mobile units 12. In particular, service center 16 may initiate the transfer of data by forwarding to NSC 14 a data message having identifiers specifying one or more mobile units and a data field. The data field may include information such as menu structures 84 and associated menu options, e-mail, voicemail, or any other suitable data. Each time a mobile unit 12 establishes a connection with NSC 14, NSC 14 determines whether it is specified by the data message. In one embodiment, NSC 14 determines whether the identifier stored in the data message substantially matches an identifier of the mobile unit 12 connecting with NSC 14. NSC 14 transfers the data message to the mobile unit 12 using voice network 18 if it is specified by the data message. For example, if service center 16 establishes new or updated menu options to provide enhanced services, service center 16 transfers menu data specifying menu structures 84 or the menu options to NSC 14. The next time a specified mobile unit 12 establishes a connection with NSC 14, NSC 14 transfers the menu options to memory 40 of mobile unit 12.

In one embodiment, mobile unit 12 establishes a connection with NSC 14 each time the ignition of a vehicle associated with mobile unit 12 is turned on, upon the detection of appropriate sensors 26, at predetermined intervals, or at any other suitable intervals. In this way, service center 16 may broadcast to a number of mobile units 12 updated news reports, weather reports, traffic reports, sports reports, financial reports, or any other information at suitable intervals without establishing a communication session with each mobile unit 12.

In yet another operation, user interface 22 and platform 24 enable access to a global computing network 98, such as the Internet, using computing device 30, interface 94, and link 96, to request and receive enhanced services from service centers 16. In particular, an operator of mobile unit 12 may establish a communication session directly with a particular service provider 16, such as an Internet website, using an on-line or off-line browser, an interface, or any other suitable software application running on computing device 30. Mobile unit 12 and service centers 16 may then transfer data using network 98. The transfer of data may include directions, configuration data 80, menu data specifying menu structures 84 and/or menu options, e-mail or voice-mail messages, and any other suitable data. Furthermore, an operator of mobile unit 12 may access a particular service center 16 using network 98 and then initiate the establishment of a communication session from service center 16 to mobile unit 12 over voice network 18. In this embodiment, mobile unit 12 and service center 16 may transfer data using global computing network 98 and/or voice network 18.

Figure 2:
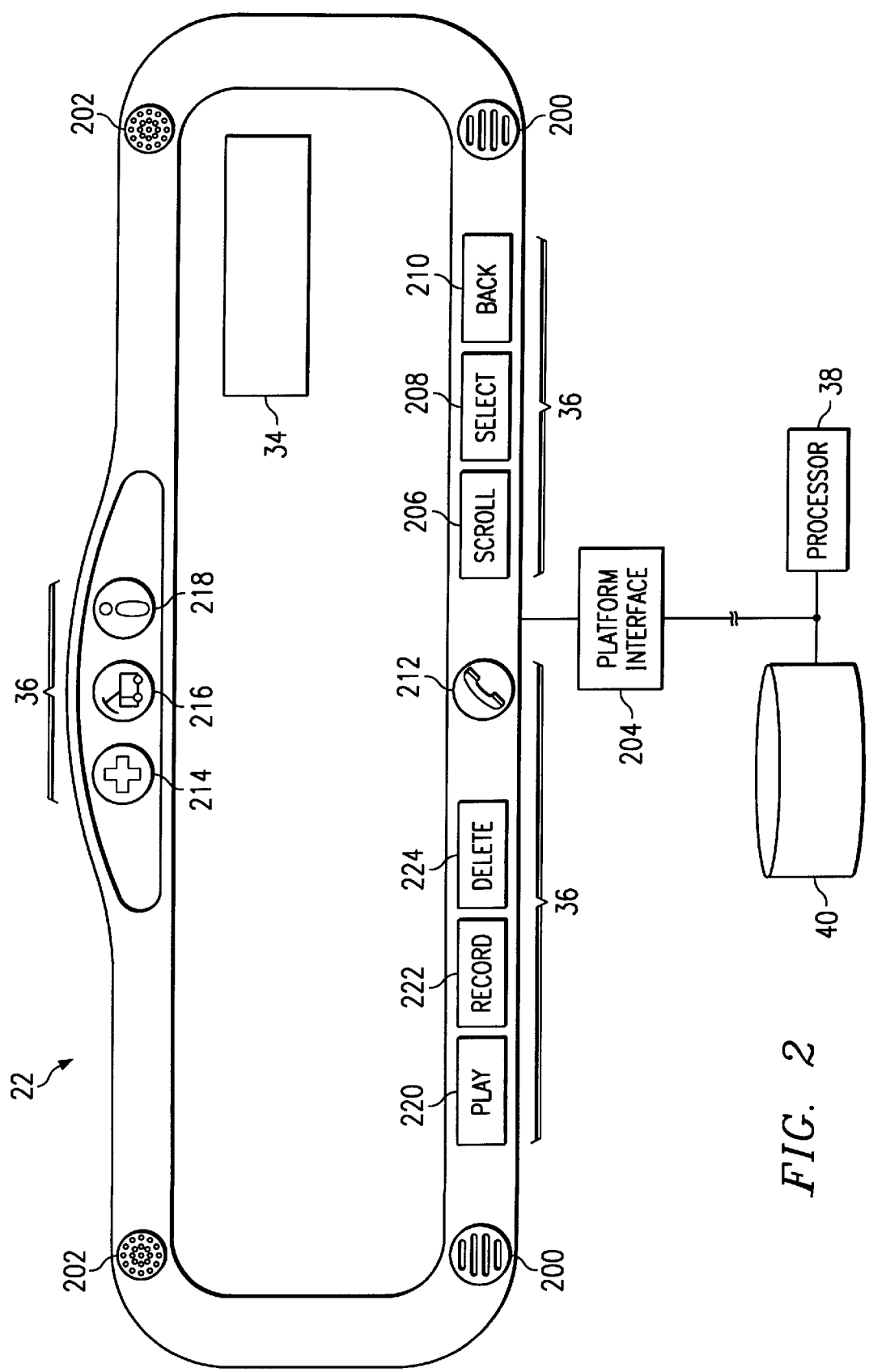
FIG. 2 illustrates one embodiment of a user interface of a mobile unit.

FIG. 2 illustrates one embodiment of user interface 22 that includes display 34, buttons 36, microphones 200, and speakers 202 coupled to platform interface module 204. Microphones 200 comprise any low or high fidelity microphone that is, in one embodiment, suitable for use with IVR unit 29, voice recognition software 68, and speech synthesis software 74. Speakers 202 comprise any speakers suitable for use with mobile unit 12. Speakers 202 are capable of producing enough volume for the audio signals to be heard in either an automotive or heavy duty trucking environment.

Platform interface module 204 comprises any suitable software and hardware components that facilitates communication between the various components of user interface 22 and the various components of platform 24, such as processor 38 and memory 40, so that interface 22 and platform 24 can share resources. Although FIG. 2 illustrates user interface 22 coupled to processor 38 and memory 40 of platform 24 by interface module 204, it should be understood that user interface 22 may include a dedicated processor that manages the communicating, processing, and interfacing features of user interface 22, and a dedicated memory that stores programs, databases, and other information used by the processor to perform its functions. Furthermore, although FIG. 2 illustrates user interface 22 as a component of a rearview mirror of a vehicle 25 associated with mobile unit 12, it should be understood that user interface 22 may be a component of a dashboard, a visor, a steering wheel, a display panel, or any other suitable portion of a vehicle 25 that is accessible by the operator of mobile unit 12.

Display 34 comprises a liquid crystal display (LCD), a field emission display (FED), or any other suitable display technology capable of displaying text and graphics. In one embodiment, display 34 is presented through the glass of a rearview mirror of vehicle 25. In particular, display 34 is positioned substantially in the plane of the mirrored surface. Buttons 36 include menu selection buttons 206, 208, 210, phone button 212, emergency assistance button 214, roadside assistance button 216, information services button 218, audio recorder buttons 220, 222, and 224, and any other appropriate buttons that control the functionality of user interface 22. In one embodiment, buttons 36 are strategically placed about the perimeter of a rearview mirror of vehicle 25, or at any position easily accessible by the operator of mobile unit 12.

Menu selection buttons 206–210 allow the operator of mobile unit 12 to navigate through a multiple levels of menu options associated with menu structures 84 stored in memory 40 and presented by processor 38 on display 34. Menu structures 84 comprise a hierarchical arrangement of menu options that enable access to information, traditional cellular services, or enhanced services. The operator of mobile unit 12 may scroll through a present level of menu options using scroll button 206, drill down into more detailed levels of menu options using select button 208, or back up to more general levels of menu options using back button 210.

For example, an operator of mobile unit 12 may use button 206 to scroll through menu options associated with entertainment services, such as available restaurants, concerts, bars, and sports events. The operator may use select button 208 to drill down into a particular type of entertainment services, such as restaurants. Again, the operator may scroll through a list of restaurants until locating a desired restaurant. The operator may then place a traditional cellular services voice call to the restaurant using handset 92, voice recognition software 68, or phone button 212, and NAM 86. Alternatively, the operator may place an enhanced services call to the restaurant using information services button 218 and enhanced services NAM 88. Having established a communication session with the selected restaurant, the operator may download direction, menu items and prices, hours of operation, or any other suitable data from the restaurant.

Phone button 212 comprises a multi-mode button that facilitates placing and receiving voice calls using traditional cellular services NAM 86 and navigating through and selecting particular menu options of menu structures 84, using voice recognition techniques. In a first mode, phone button 212 places and receives traditional voice calls. In particular, an operator of mobile unit 12 may navigate through a phone directory using display 34 and buttons 36 and place an outgoing call using traditional cellular services NAM 86 by activating phone button 212 or handset 92 while a selected phone number is highlighted, underlined, or otherwise specified on display 34. An operator of mobile unit 12 may also answer an incoming voice call by activating phone button 212.

In a second mode, activating phone button 212 causes processor 38 to activate IVR unit 29 and execute voice recognition software 68 stored in memory 40. Activating IVR unit 29 and executing voice recognition software 68 allows processor 38 to place and receive traditional voice calls and to perform any of the features and functions of mobile unit 12 using voice recognition techniques. In particular, an operator of mobile unit 12 may navigate through and select particular menu options of menu structures 84 by issuing verbal commands rather than by activating service buttons 36. For example, an operator of mobile unit 12 may issue a verbal command to select a telephone directory menu option from menu structures 84. The operator may further issue a verbal command to scroll through a telephone directory and dial a particular telephone number associated with a person, a business, or any other entity having a telephone number stored in memory 40. In another example, an operator of mobile unit 12 may issue a verbal command to select a particular enhanced service offered by a service center 16, to monitor and control a particular sensor 26, to activate a particular actuator 28, or generally to perform any other feature or function offered by mobile unit 12, using voice recognition techniques.

Emergency assistance button 214 facilitates requesting enhanced services from service centers 16, such as police departments, fire departments, hospitals, or any other organization or personnel that provides emergency services to persons or vehicles associated with mobile unit 12. For example, activating emergency assistance button 214 automatically alerts the proper authorities in the event of a vehicle theft, and provides a location update and tracking information to aid in vehicle recovery.

In another example, activating emergency assistance button 214 summons medical personnel in the event of a medical emergency, and provides to the appropriate service center 16 relevant medical information about the operator of mobile unit 12. In this regard, mobile unit 12 generates and issues a service message 58 to NSC 14. NSC 14 uses service message 58 to access database 122 and to select an appropriate service center 16 based upon, in one embodiment, the location of mobile unit 12. NSC 14 then provides to the selected service center 16 information such as location, engine data, personal medical data, or any other suitable information on the status or condition of mobile unit 12, or its operator. Service center 16 then establishes a communication session with mobile unit 12 so that it may deliver audible messages or perform other voice communications using voice network 18, to provide emergency and security services to persons or vehicles associated with mobile unit 12. Service center 16 may also provide data services such as remote security services using actuators 28 coupled to mobile unit 12. For example, service center 16 may issue commands to immobilize a vehicle, sound an alarm, lock/unlock doors, or perform any function remotely using an appropriate actuator 28 coupled to mobile unit 12.

Roadside assistance button 216 facilitates requesting enhanced services from service centers 16, such as towing companies, taxi/shuttle services, car dealerships, gas stations, or any other organization or personnel that provides roadside assistance to persons or vehicles associated with mobile unit 12. For example, NSC 14 may select an appropriate service center 16 based upon, in one embodiment, the location of mobile unit 12, in response to the activation of roadside assistance button 216. NSC 14 then provides to the appropriate service center 16 a precise vehicle location and previous travel direction of mobile unit 12, as well as the color, make, model, and license number of the vehicle associated with mobile unit 12. Service center 16 may then effectively dispatch personnel to assist the operator of mobile unit 12. In dispatching a variety of services, service center 16 may send a confirmation to mobile unit 12 and a time of arrival estimate. Furthermore, multiple service centers 16 may coordinate efforts to provide enhanced services to the operator of mobile unit 12. For example, a towing company may dispatch a tow truck to the site of an accident while a taxi/shuttle service may simultaneously dispatch a vehicle to transport the operator of mobile unit 12 to a desired destination.

Information services button 218 facilitates requesting enhanced services from service centers 16, such as news agencies, weather bureaus, entertainment services, travel services, traffic reporters, financial institutions, or any other organization or personnel that provides information services to persons or vehicles associated with mobile unit 12. In one embodiment, an operator of mobile unit 12 activates information services button 218 to select a particular menu option from menu structures 84 presented by processor 38 on display 34.

For example, display 34 presents high-level menu options that provide a general services menu including news, weather, business, travel, traffic, sports, or any other general information service. The operator drills down into more detailed menu levels associated with a particular class of service, such as, for example, travel services. In response, display 34 presents more detailed menu options that include, for example, airlines, railroads, buses, cruises, or any other particular mode of travel. The operator again drills down into more detailed menu levels associated with a particular mode of travel, such as air travel. In response, display 34 presents even more detailed menu options that includes, for example, American Airlines, Northwest Airlines, United Airlines, and any other suitable airline service. The operator then initiates a communication session with a particular airline service by activating information services button 218 while the appropriate service center 16 is highlighted, underlined, or otherwise specified on display 34. Therefore, the operator may use menu selection buttons 206–210 to navigate through multiple levels of menu options associated with a particular class of services and then select one or more service centers 16 using information services button 218.

Figure 4:
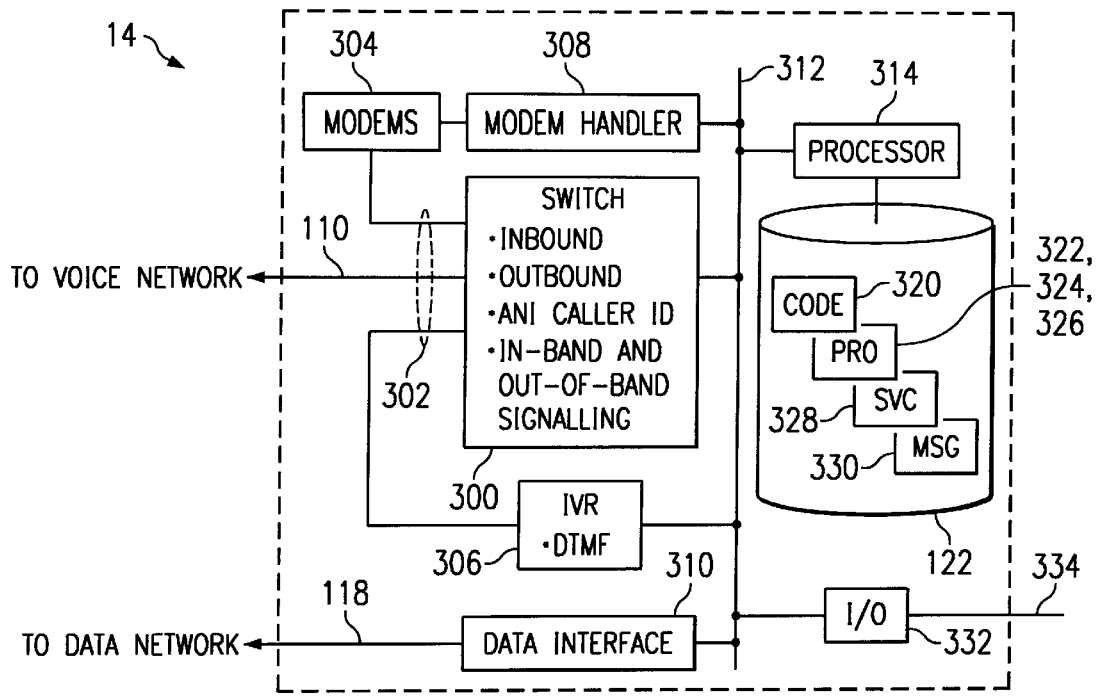
FIG. 4 illustrates in more detail one embodiment of the NSC.

In another embodiment, the operator of mobile unit 12 activates information services button 218 to initiate an interactive voice session with NSC 14, discussed in more detail in FIG. 4, using voice recognition techniques. In particular, processor 38 establishes a connection with an interactive voice response (IVR) unit associated with NSC 14 in response to the activation of information services button 218. This IVR unit interacts with the operator of mobile unit 12 using voice recognition techniques to present verbal menu options that may or may not also be presented by display 34. The operator of mobile unit 12 selects an appropriate service center 16 by issuing verbal commands into microphone 200. The IVR unit then establishes a communication session between mobile unit 12 and the selected service center 16. By communicating with an interactive voice response unit associated with NSC 14, mobile unit 12 provides access to many service centers 16 whose menu structures 84 may not yet be stored by memory 40 and presented by display 34.

The selected service center 16 may present additional enhanced services options to the operator of mobile unit 12 in a number of ways. First, it may download menu data specifying new or updated menu options and/or menu structures 84 to processor 38 so that the operator of mobile unit 12 may select particular enhanced services using information services button 218. Second, an IVR unit associated with service center 16, discussed in detail in FIG. 5, may interact with the operator of mobile unit 12 using voice recognition techniques to provide enhanced services. Third, a live agent or customer representative of service center 16 may provide enhanced services to the operator of mobile unit 12.

Audio recorder buttons 220–224 facilitate recording, playing, and deleting audio recordings 72 downloaded from any internal or external source, such as, for example, service centers 16, and stored in memory 40. For example, an operator of mobile unit 12 may navigate through multiple levels of menu options to select a particular service center 16 that provides direction services, such as, in one embodiment, step-by-step directions from an origination location to a destination location. Processor 38 initiates a communication session between mobile unit 12 and the selected service center 16. Mobile unit 12 provides location information, such as origination location and destination location information, to service center 16.

In general, the origination location comprises any location from which the directions will originate. In one embodiment, the origination location of mobile unit 12 is the current location of mobile unit 12, and may be represented as "from" geographical coordinates. In this embodiment, GPS device 48 of mobile unit 12 may use positioning techniques to automatically generate "from" coordinates associated with a particular location of mobile unit 12. The destination location comprises the location at which the directions will terminate. The destination location may be represented by "to" geographical coordinates. In one embodiment, mobile unit 12 specifies the termination of the directions by a name associated with the destination location, (e.g., restaurant name, street address, landmarks, etc.). The destination location may comprise the location of service center 16.

Service center 16 then downloads directions from the origination location to the selected destination location, taking into account traffic conditions, weather conditions, available gas and lodging facilities, and/or any other suitable factors. It should be understood that one or a combination of an agent or customer representative, an interactive voice response unit, and/or a processor at service center 16 may communicate the directions to mobile unit 12. In one embodiment, service center 16 downloads to audio recorder 70 different segments of the directions separated by suitable separator signals. The directions may comprise a series of commands, geographical coordinates, regions, zones, or any other suitable indicators of location that define a particular path or route of travel. Some coordinates, such as notification coordinates, indicate a near proximity to an upcoming driving event, such as a turn or exit. Other coordinates, such as realization coordinates, indicate a successfully completed command.

For example, notification coordinates may define a notification region, zone, geographical coordinate, or any other suitable location in proximity to the location of the next step of the directions. In one embodiment, if the location of mobile unit 12 substantially corresponds with the notification region defined by the notification coordinates, then the operator of mobile unit 12 is alerted of an upcoming direction command. Similarly, realization coordinates may define a realization region, zone, geographical coordinate, or any other suitable location in proximity to the location of the previous step of the directions. In one embodiment, if the location of mobile unit 12 substantially corresponds with the realization region defined by the realization coordinates, then the previous direction command was successfully executed. In one embodiment, each segment of the directions comprises direction commands, notification regions associated with the direction commands, and/or realization regions associated with the direction commands.

The directions communicated over voice network 18 may be separated using dual tone multi-frequency (DTMF) signals or other appropriate separator signals. Processor 38 and audio recorder 70 recognize the separator signals and record different segments of the directions separately so that each segment may be played back in succession at the appropriate time and location. In another embodiment, service center 16 downloads to audio recorder 70 textual directions in a data file. In this embodiment, the textual directions may also be separated into segments by separator signals or codes, such as, for example, text delimiters. Processor 38 and audio recorder 70 use speech synthesis software 74 to access speech synthesis database 76 and translate the textual directions into audio voice signals for playback using speakers 202. In yet another embodiment, service center 16 downloads to audio recorder 70 directions as audio voice signals in a data file for playback using speakers 202. The audio voice signals may also be separated into segments by separator signals or codes.

Once the directions are downloaded, an operator of mobile unit 12 may manually play back separate segments of audio recordings 72 by activating play button 220. For example, the operator may play back one segment of the directions, stop audio recorder 70, wait a period of time, and then again play back another segment of the directions. The operator of mobile unit 12 may also record over or delete audio recordings 72 by activating buttons 222 and/or 224, respectively. In one embodiment, processor 38 automatically plays back audio recordings 72 stored in memory 40. In this embodiment, processor 38 communicates with GPS device 48 to receive the current location of mobile unit 12. Processor 38 plays the current segment of audio recording 72 when it detects that the current location of mobile unit 12 substantially corresponds with a region, zone, geographical coordinate, or some other indicator of location defined by the notification coordinates downloaded from service center 16. For example, a notification region defined by the notification coordinates may be established one hundred feet in advance of the location of the next driving event, such as a turn or an exit. Upon entering the notification region, mobile unit 12 issues the next direction command to alert the operator of the upcoming driving event.

Processor 38 determines whether the played back segment of the directions was successfully executed by comparing the location of mobile unit 12 with the realization coordinates downloaded from service center 16. If the location of mobile unit 12 substantially corresponds with the region, zone, geographical coordinate, or some other indicator of location defined by the realization coordinates, then the segment of directions was successfully completed. For example, a realization region defined by the realization coordinates may be established some distance beyond the location of the previous driving event. If mobile unit 12 fails to enter the realization region a suitable period of time after the previous direction commend was issued, then mobile unit 12 alerts the driver of the unsuccessful execution of the previous direction command. If the played back segment of the directions was successfully executed, processor 38 again communicates with GPS device 48 to determine the proper time and location to play back the next segment of the directions. If the played back segment of the directions was incorrectly executed, processor 38 may issue a verbal or textual error message to the operator of mobile unit 12, and replay the segment of the directions that was incorrectly executed.

Although the previous description of audio recorder 70 and buttons 220–224 was detailed with respect to downloading, recording, playing, and deleting directions, it should be understood that mobile unit 12 may perform these techniques using voicemails, e-mails, or any other suitable communication from service center 16, the operator of mobile unit 12, or any other appropriate source. In particular, processor 38 may execute speech synthesis software 74 to translate e-mails into verbal communication and play back the e-mails using speakers 202. Furthermore, an operator of mobile unit 12 may activate button 220 to play back voicemails stored in memory 40 as audio recordings 72. Moreover, the operator of mobile unit 12 may use audio recorder 70 as a dictaphone to record, play back, and delete voice messages.

FIG. 3 illustrates a number of different audio modes 62 used by communication system 10. In general, audio modes 62a–62s, referred to generally as audio modes 62, define various audio states used by mobile unit 12 to perform its unique audio functions. Although FIG. 3 illustrates only audio modes 62a–62s, it should be understood that communication system 10 contemplates any number and/or combination of audio modes 62 to perform the unique audio functions of the present invention.

Idle audio modes 62a–62c define the audio states of mobile unit 12 when transceiver 42 is idle. Idle audio modes include play mode 62a, record mode 62b, and voice recognition mode 62c. Play mode 62a defines the default audio mode of mobile unit 12. Mobile unit 12 enters this mode upon power up or upon exiting any other audio mode 62. Play mode 62a is used to play back messages using audio recorder 70 when a voice call is not currently in progress. Record mode 62b defines an audio mode of mobile unit 12 used to record voice communications using microphone 200 and audio recorder 70. Mobile unit 12 enters record mode 62b upon detecting the activation of record button 222 of user interface 22. Voice recognition mode 62c defines an audio mode of mobile unit 12 used to control the features and functions of mobile unit 12 using voice recognition techniques. Mobile unit 12 enters voice recognition mode 62c upon detecting the activation of phone button 212 of user interface 22.

Call setup mode 62d defines an audio mode of mobile unit 12 used during an incoming or outgoing voice call using enhanced services NAM 88. In one embodiment, mobile unit 12 enters call setup mode 62d during voice communications between modem 44 of mobile unit 12 and modem 304 of NSC 14 using voice network 18. Audio test call setup mode 62e defines an audio mode of mobile unit 12 used to perform an audio test that verifies proper communication between mobile unit 12 and NSC 14 during incoming or outgoing voice calls between mobile unit 12 and NSC 14. In one embodiment, mobile unit 12 enters audio mode 62e when audio interface 50 of mobile unit 12 executes the audio test. In this embodiment, audio interface 50 and speakers 202 sound DTMF tones generated by modems 44 and 304 during the communication between mobile unit 12 and NSC 14. In this mode, a technician may verify proper communication between mobile unit 12 and NSC 14 by monitoring the DTMF tones generated by modems 44 and 304. Mobile unit 12 may toggle between modes 62d and 62e by manipulating a flag associated with configuration data 80.

Ring mode 62f defines an audio mode of mobile unit 12 used to alert an operator of mobile unit 12 of an incoming call. Mobile unit 12 enters ring mode 62f upon receiving an incoming call after mobile unit 12 switches from data mode to voice mode. For example, in one embodiment, calls communicated to mobile unit 12 from NSC 14 may begin in a data mode. After the data is exchanged between mobile unit 12 and NSC 14, NSC 14 may command mobile unit 12 to switch to a voice mode, while NSC 14 bridges the voice call using voice network 18. Upon receiving the voice call, mobile unit 12 enters ring mode 62f to alert the operator of mobile unit 12 of the incoming call.

Audio test ring mode 62g defines an audio mode of mobile unit 12 used to perform an audio test that verifies proper communication of the voice call from NSC 14 to mobile unit 12. In one embodiment, mobile unit 12 enters audio test ring mode 62g upon receiving an incoming call in a voice mode. While in audio test ring mode 62g, audio interface 50 and speakers 202 communicate the DTMF tones generated by modem 44 of mobile unit 12 and modem 304 of NSC 14. Mobile unit 12 may toggle between modes 62f and 62g by manipulating a flag associated with configuration data 80.

Handsfree voice mode 62h defines an audio mode of mobile unit 12 used for all hands free voice communications. Mobile unit 12 enters hands free voice mode 62h upon answering an incoming call from ring mode 62f, or upon connecting an outgoing voice call to NSC 14 in a voice mode using voice network 18. Handsfree voice DTMF detection mode 62i defines an audio mode of mobile unit 12 used to reduce or eliminate DTMF tones issued by a service center 16 to control the transfer of data to audio recorder 70. Mobile unit 12 enters handsfree voice DTMF detection mode 62i upon receipt of any DTMF tones from an external modem. Hands free voice DTMF transmission mode 62j defines an audio mode of mobile unit 12 used to transmit DTMF tones over voice network 18. In one embodiment, mobile unit 12 activates hands free voice DTMF transmission mode 62j when an operator of mobile unit 12 activates a key of handset 92. For example, if an operator of mobile unit 12 interacts with IVR unit 306 of NSC 14, mobile unit 12 transmits DTMF tones to indicate a keypress by using mode 62j.

Handsfree voice service center record mode 62k defines an audio mode of mobile unit 12 used to record only the communications from service center 16 during a communication session. In one embodiment, mobile unit 12 enters mode 62k to record directions or other commands and/or communications using audio recorder 70. Handsfree voice service center/mobile unit record mode 62m defines an audio mode of mobile unit 12 used to record both sides of a communication session between mobile unit 12 and service center 16. In one embodiment, mobile unit 12 enters audio mode 62m when record button 222 of user interface 22 is activated during a handsfree voice call between mobile unit 12 and a service center 16. Handsfree voice mobile unit play mode 62n defines an audio mode of mobile unit 12 used to play back audio recordings 72 using audio recorder 70 and speakers 202. In one embodiment, mobile unit 12 enters audio mode 62n when play button 220 is activated during a handsfree voice call. Handsfree voice service center play mode 62o defines an audio mode of mobile unit 12 used to provide feedback to service provider 16 that a communication was received properly. For example, mobile unit 12 uses audio mode 62o to signify to service center 16 that the directions were received properly.

Handset voice mode 62p defines an audio mode of mobile unit 12 used to place a voice call using handset 92. In one embodiment, mobile unit 12 enters handset voice mode 62p when handset 92 is activated, such as when handset 92 is removed from its associated cradle. Handset DTMF detection mode 62q defines an audio mode of mobile unit 12 used to reduce or eliminate DTMF tones issued by service center 16 to transfer data to audio recorder 70 of mobile unit 12. In one embodiment, mobile unit 12 enters audio mode 62q upon receipt of any DTMF tones from an external modem.

Handset DTMF transmission mode 62r defines an audio mode of mobile unit 12 used to transmit DTMF tones over voice network 18. In one embodiment, mobile unit 12 enters audio mode 62r during a handset voice call where the operator of mobile unit 12 activates a key of handset 92. Handset voice service center/mobile unit record mode 62s defines an audio mode of mobile unit 12 used to record both sides of a communication session between mobile unit 12 and a service center 16 that transfers data to audio recorder 70. In one embodiment mobile unit 12 enters audio mode 62s upon detecting the activation of record button 222 of user interface 22 during a handset voice call.

FIG. 4 illustrates in more detail one embodiment of NSC 14. A switch 300 couples to voice network 18 using voice paths 110. Switch 300 includes hardware and associated software to process manipulate, switch, and manage a variety of voice paths 302 in NSC 14. For example, switch 300 may receive inbound calls from voice network 18 or place outbound calls to voice network 18. Also, switch 300 includes automatic number identification (ANI) generation or caller ID techniques that can include an identifier of mobile unit 12 on outbound calls to service center 16. This is an advantageous aspect of the operation of NSC 14 which allows service center 16 to associate the voice component and the data component of a voice/data session. The generation and communication of ANI or caller ID information may be performed by switch 300 using any suitable in-band (e.g., DTMF) or out-of-band (e.g., SS-7) technique. This may be performed by overriding identifiers of NSC 14 or voice path 114 that may normally be associated with the call directed to service center 16.

Switch 300 may also establish voice paths with modems 304 and an interactive voice response (IVR) unit 306. Modems 304 and modem handler 308 allow NSC 14 to establish modem connections for high capacity data communication among mobile units 12, service centers 16, and other external devices accessible through voice network 18. IVR unit 306 provides interactive voice response sessions among components in communication system 10, and may also provide communication between NSC 14, mobile units 12, and service centers 16 using dual tone multi-frequency (DTMF) techniques. In a particular example, switch 300 directs service message 58 received from mobile unit 12 to switch 300 or IVR unit 306 for DTMF decoding. NSC 14 contemplates modems 304, DTMF coders/decoders, or any other suitable coding and/or decoding technique to communicate data using voice paths 302.

A data interface 310 couples to data network 20 using data path 118. Data interface 310 comprises a bridge, router, gateway, adapter card, or any other suitable collection of hardware and/or software to provide data communication capability between NSC 14 and data network 20. In a particular embodiment, data interface 310 supports a variety of dedicated data communication protocols, such as frame relay, X.25, TCP/IP, or other suitable dedicated protocol. Data interface 310 may also support a variety of nondedicated, switched, or dial-up technology and protocols.

Modem handler 308, switch 300, IVR unit 306, and data interface 310 all couple to data bus 312. A processor 314 also couples to data bus 312 and provides overall management and control of NSC 14. Processor 314 accesses information maintained in database 122 to perform its functions. This information includes a code table 320; profile tables 322, 324, and 326; a service table 328; and message queue 330, which are described in more detail below with reference to FIGS. 6-10. An input/output (I/O) module 332 also couples to data bus 312 and provides external access to the operation and function of NSC 14 using link 334. I/O module 332 and link 334 may be used to externally control or monitor the operation of NSC 14, and may also be used to link and coordinate operation between a number of NSCs 14 in a network configuration.

Figure 5:
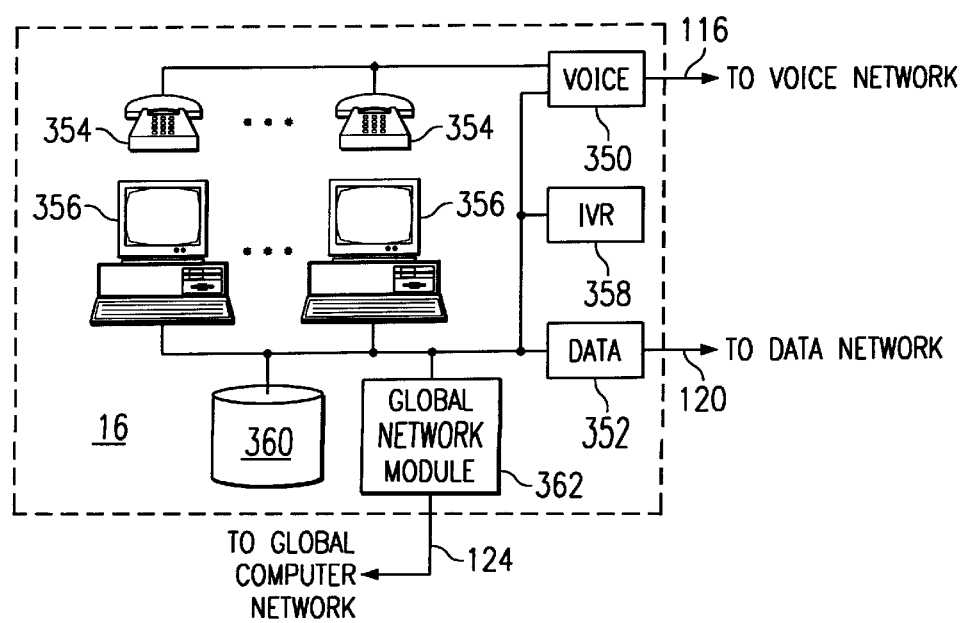
FIG. 5 illustrates in more detail one embodiment of a service center.

FIG. 5 illustrates in more detail one embodiment of a service center 16. In this embodiment, service center 16 receives a call or voice component of the communication session at voice module 350 and a message or data component of the communication session at data module 352. Depending on the particular implementation, the number of agent stations served, the capacity and loading characteristics of service center 16, and other considerations, voice module 350 may comprise an automatic call distributor (ACD), a private branch exchange (PBX), a simple call distributor, or other suitable hardware and software to receive and distribute the voice component of the communication session to one of a number of voice instruments 354 in service center 16. Similarly, data module 352 may comprise hardware and software associated with a local area network (LAN), wide area network (WAN), or other suitable technology that couples the data component of the communication session to one of a number of workstations 356 in service center 16. It should be understood that voice module 350 and data module 352 may be integral or separate components, and may support a variety of telephony/data applications and/or protocols, such as telephone application programming interface (TAPI), telephony server application programming interface (TSAPI), and computer telephony integration (CTI).

An agent or customer representative operates voice instrument 354 and an associated workstation 356 to conduct the communication session with the operator of mobile unit 12. In one embodiment, service center 16 includes a local interactive voice response (IVR) unit 358 that provides menu options to a caller; receives selections from the caller regarding enhanced services provided by service center 16; and facilitates providing the selected services. By using an IVR unit 358, service center 16 may fulfill the service requests of a caller in combination with or independent of a live agent or customer representative.

Service center 16 also includes database 360 which contains information related to the services offered by the particular service center 16. For example, if service center 16 provides direction services, then database 360 may store maps, geographical coordinates, or other geographical information that allows service center 16 to provide directions to the operators of mobile units 12 in both audible and data formats. Similarly, database 360 may store traffic information, weather information, personal medical information, dispatch numbers, emergency personnel locations, or other information that allows service center 16 to dispatch assistance to the operators of mobile units 12.

Service center 16 may further include a global computer network module 362 that provides access to global computer network 98, such as the Internet, using external link 124. Global computer network module 362 comprises a bridge, router, gateway, adapter card, or any other suitable collection of hardware and/or software components that provide data communication capability between service center 16 and global computer network 98. In this embodiment, service centers 16 may provide services offered by network 98 as well as services related to information stored in database 360. For example, service center 16 may access network 98 and/or database 360 to provide directions using geographical, traffic, and/or weather information; monitor current traffic and weather conditions in a particular location; arrange travel reservations; provide financial, news, and sports reports; or provide any other suitable information services.

In operation of FIGS. 4 and 5, switch 300 of NSC 14 receives service message 58 from mobile unit 12 using voice paths 110. Switch 300 then recognizes the communication as a service message and, in a particular embodiment, communicates service message 58 over one of its voice paths 302 to IVR unit 306 for DTMF decoding. Switch 300 may also perform the DTMF decoding or may pass the service message to modems 304 and modem handler 308 for decoding. Decoding of service message 58 by a DTMF decoder in IVR unit 306 or switch 300 may provide better accuracy and reliability in receiving service message 58 from mobile unit 12.

Upon decoding service message 58, modem handler 308, switch 300, or IVR unit 306 passes information contained in service message 58 to processor 314 using data bus 312. Processor 314 then accesses code table 320 and profile tables 322, 324, and 326 to determine the appropriate service center 16 with which to establish a communication session based on the contents of service message 58. Processor 314 also accesses service table 322 to determine the access parameters to establish both voice and data communication with the selected service center 16. Processor 314 may also store data messages received from or to be transmitted to mobile units 12 and/or service centers 16 in message queue 330.

Upon determining service center 16 and the appropriate information to access service center 16, processor 314 directs switch 300 to place an outbound call to service center 16 using voice path 114 and voice network 18. Using either in-band or out-of-band signaling, switch 300 also associates an identifier of mobile unit 12 with the call placed to service center 16. In one embodiment, processor 314 also directs data interface 310 to communicate a data message to service center 16 using data path 118 and data network 20. In this embodiment, both the call placed to service center 16 by switch 300 and the data message communicated to service center 16 by data interface 310 are associated with an identifier of mobile unit 12 to allow service center 16 to associate the voice component and the data component of the communication session.

In one embodiment, service center 16 receives the call at voice module 350 and the data message at data module 352. Voice module 350 transfers or directs the call to a selected voice instrument 354 and communicates associated automatic number identification (ANI) information, caller ID, or other identifier of the mobile unit 12 to an associated workstation 356. Workstation 356 retrieves the data message with the same mobile unit identifier from data module 352. The display in workstation 356 may display map locations, status information, or other information received from NSC 14 or mobile unit 12 itself, such as information from service message 58 about mobile unit 12 and/or its associated operator.

Upon establishing voice communication with service center 16, switch 300 bridges or connects the original inbound call from mobile unit 12 with the outbound call to service center 16 to establish a voice path between mobile unit 12 and service center 16. At any time before, during, or after the communication session, switch 300 may direct the inbound call from mobile unit 12 or the outbound call to service center 16 to modems 304 and modem handler 308 to conduct a high speed data exchange between mobile unit 12, NSC 14, and/or service center 16. Switch 300 may also direct the inbound call from mobile unit 12 or the outbound call to service center 16 to IVR unit 306 to conduct an interactive voice response session with mobile unit 12 and/or service center 16. During modem or IVR communication, mobile unit 12 may provide location and/or status information to be included in a data message for eventual delivery to service center 16. Also, NSC 14 may provide data to mobile unit 12 for software updates, remote commanding (e.g., door unlock, alarm disable, etc.), authorized number programming, feature flag setting, or other functions. Moreover, service center 16 may provide information relating to the emergency service, roadside assistance, or other information services requested by mobile unit 12.

FIG. 6 illustrates an exemplary embodiment of a code table 320 stored in database 122 of NSC 14. Entries in code table 320 associate a call type 400 specified in service message 58 with an indicator 402 of a particular profile table 322, 324, or 326. For example, call types 400 identify different services related to a class of services requested by mobile unit 12, such as a request for emergency assistance from fire departments, police departments, hospitals, and any other suitable organization; roadside assistance from towing services, taxi/shuttle services, car dealerships, and any other suitable organization; information services from news agencies, weather bureaus, financial institutions, travel services, traffic reporters, entertainment services, and any other suitable organization; or any other suitable service and/or class of services provided by service centers 16. Indicators 402 identify those profile tables 322, 324, and 326 that relate information specific to mobile units 12, such as identification and location information, to service centers 16 associated with a particular call type 400.

FIGS. 7A–7C illustrate exemplary embodiments of profile tables 322a–322c, generally referred to as profile tables 322, stored in database 122 of NSC 14. Entries in tables 322 relate an identifier 404 of mobile unit 12 and location information 406 associated with mobile unit 12 with an identifier 408 of those service centers 16 that provide emergency services to mobile units 12. In this particular embodiment, identifier 404 of mobile unit 12 may comprise the mobile identification number and/or electronic serial number (MIN/ESN) 410, a vehicle identification number (VIN) 412, or any other suitable information associated with or identifying mobile unit 12.

Location information 406 may comprise city/state information in the United States, Canada, Mexico, or any other suitable country; geographical coordinates (e.g., longitude, latitude, and altitude); or any other appropriate information relating the location of mobile units 12 with particular service centers 16. Identifiers 408 indicate those service centers 16 associated with a particular call type 400. For example, services centers 16 identified in profile tables 322 may comprise police departments, fire departments, hospitals, or any other organization or personnel that provides emergency services to persons or vehicles associated with mobile unit 12. Therefore, in a particular embodiment, a call type 400, an identifier 404 of mobile unit 12, and location information 406 of mobile unit 12, together specify an identifier 408 of the appropriate service center 16 to handle a service request for emergency services.

FIGS. 8A–8C illustrate exemplary embodiments of profile tables 324a–324c, generally referred to as profile tables 324, stored in database 122 of NSC 14. Entries in tables 324 relate an identifier 404 of mobile unit 12 and location information 406 associated with mobile unit 12 with an identifier 408 of those service centers 16 that provide roadside assistance to mobile units 12. Service centers 16 identified in profile tables 324 may comprise towing services, taxi/shuttle service, car dealerships, or any other organization or personnel that provides roadside assistance to persons or vehicles associated with mobile unit 12.

FIGS. 9A–9C illustrate exemplary embodiments of profiles tables 326a–326c, generally referred to as profile tables 326, stored in database 122 of NSC 14. Entries in tables 326 relate an identifier 404 of mobile unit 12 and location information 406 associated with mobile unit 12 with an identifier 408 of those service centers 16 that provide information services to mobile units 12. Service centers 16 identified in profile tables 324 may comprise news agencies, weather bureaus, financial institutions, travel services, traffic reporters, entertainment services, and any other suitable organization or personnel that provides information services to a person or vehicle associated with mobile unit 12.

In a particular embodiment, as illustrated in FIGS. 7–9, profile tables 322–326 include an entry for each mobile unit 12 serviced by communication system 10. In this embodiment, location information 406 relates each mobile unit 12 with service centers 16 for only those locations at which the mobile unit 12 maintains a subscription with communication system 10. In another embodiment, profile tables 322 relate location information 406 with service centers 16 for each mobile unit 12.

It should be understood that all or a portion of profile tables 322–326 may be stored in one or more locations and the information stored in tables 322–326 may be arranged in any manner in any number of tables to establish the associations described above. It should be further understood that profile tables 322, 324, and 326 include tables for three types of services each for illustrative purposes only, and that the present invention contemplates any number of profile tables to support any number of enhanced services provided by communication system 10. It should be still further understood that although profile tables 322a–322c, 324a–324c, and 326a–326c illustrate three rows of entries each, the present invention contemplates any number of entries to support provisioning enhanced services to any number of operators of mobile units 12. Moreover, although profile tables 322–326 are described with reference to entries 404, 406, and 408, it should be understood that tables 322–326 may include any number of entries that provide information regarding the medical history of the primary operators of mobile unit 12, the service history of mobile unit 12, service preferences of the operators of mobile units 12, or any other information about mobile unit 12, and/or its associated vehicle and operators.

FIG. 10 illustrates an exemplary embodiment of service table 328 that associates identifier 408 of service centers 16 with voice access parameters 420 and data access parameters 422 to establish voice communication and, optionally, data communication, respectively, with service centers 16 in communication system 10. Voice access parameters 420 may comprise telephone numbers, telephone extensions, trunk/line identifiers, or any other address or identifier supported by voice network 18. Data access parameters 422 may include LAN or WAN addresses, uniform resource locator (URL) addresses, telephone numbers, transport control protocol or Internet protocol (TCP/IP) addresses, channel groups and channels, virtual port identifiers (VPIs), virtual channel identifiers (VCIs), or any other address or identifier supported by data network 20.

Figure 11:
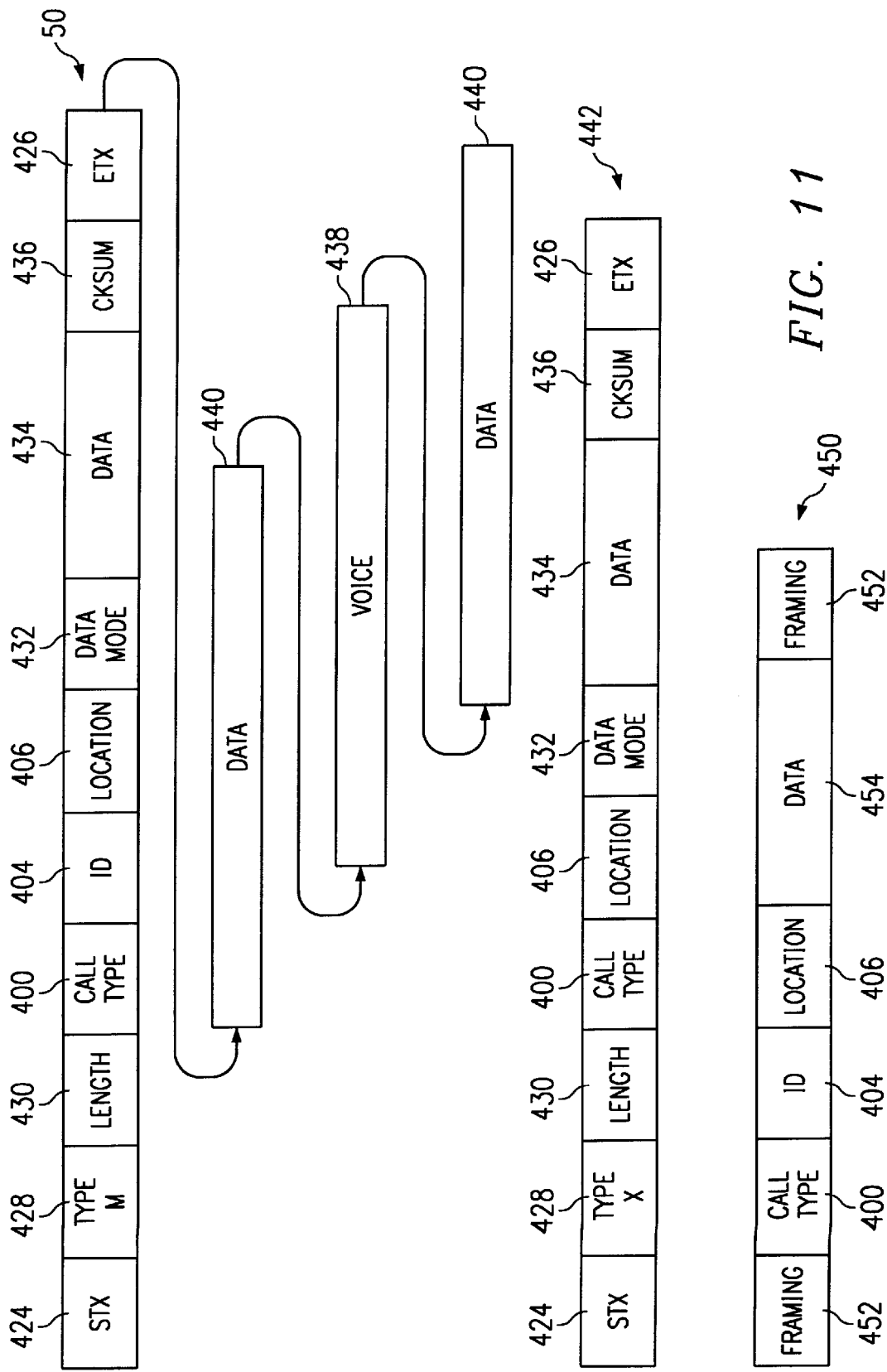
FIG. 11 illustrates exemplary message formats and messaging techniques used in the communication system.

FIG. 11 illustrates a variety of message formats and messaging techniques used in communication system 10. Message queue 330 may store information temporarily or permanently in any of these message formats. A service message 58 includes a start field (STX) 424 and an end field (ETX) 426. Service message 58 also includes a message type 428 and length 430. NSC 14 uses call type 400, identifier 404, and/or location information 406 provided in service message 58 to determine service center 16 using code table 320 and profile tables 322–326. A data mode 432, which is described below, indicates whether communications between mobile unit 12 and NSC 14 should include a data mode (e.g., modems, DTMF, etc.) to exchange information. Data 434 in service message 58 may include a date and time, sensor readings generated or gathered by mobile unit 12, alarm conditions, or any other information communicated from mobile unit 12 to NSC 14. NSC 14 uses a checksum 436 to ensure the integrity and accuracy of service message 58 received from mobile unit 12.

In a particular embodiment, mobile unit 12 communicates service message 58 to NSC 14 using DTMF techniques. Switch 300 or IVR unit 306 decodes service message 58 and passes this information to processor 314. Depending on the value of data mode 432, communication between mobile unit 12 and NSC 14 may then progress directly to voice mode 438. However, depending on the requested service, the data required, and other factors, mobile unit 12 and NSC 14 may engage in a data mode 440 before and/or after voice mode 438.

In some circumstances, NSC 14 receives a priority service message 442 during preexisting communication between mobile unit 12 and NSC 14. Since mobile unit 12 and NSC 14 have already established a voice path using voice network 18, priority service message 442 may or may not include identifier 404 of mobile unit 12. Upon receiving priority service message 442, NSC 14 suspends or terminates preexisting communications between mobile unit 12 and NSC 14 and establishes a voice and/or data session with an appropriate service center 16 to provide the priority service.

Data message 450 communicated by NSC 14 to service center 16 includes framing data 452 suitable for the communication protocol supported by data network 20. Data message 450 also includes identifier 404 of mobile unit 12 and, optionally, call type 400. Workstation 356 in service center 16 may display graphically or textually data 454 contained in data message 450 as part of the communication session between mobile unit 12 and service center 16. Data 454 may include data 434 of service message 58 as well as data retrieved from memory 122, such as, for example, information found in profile tables 322–326.

Figure 12A:
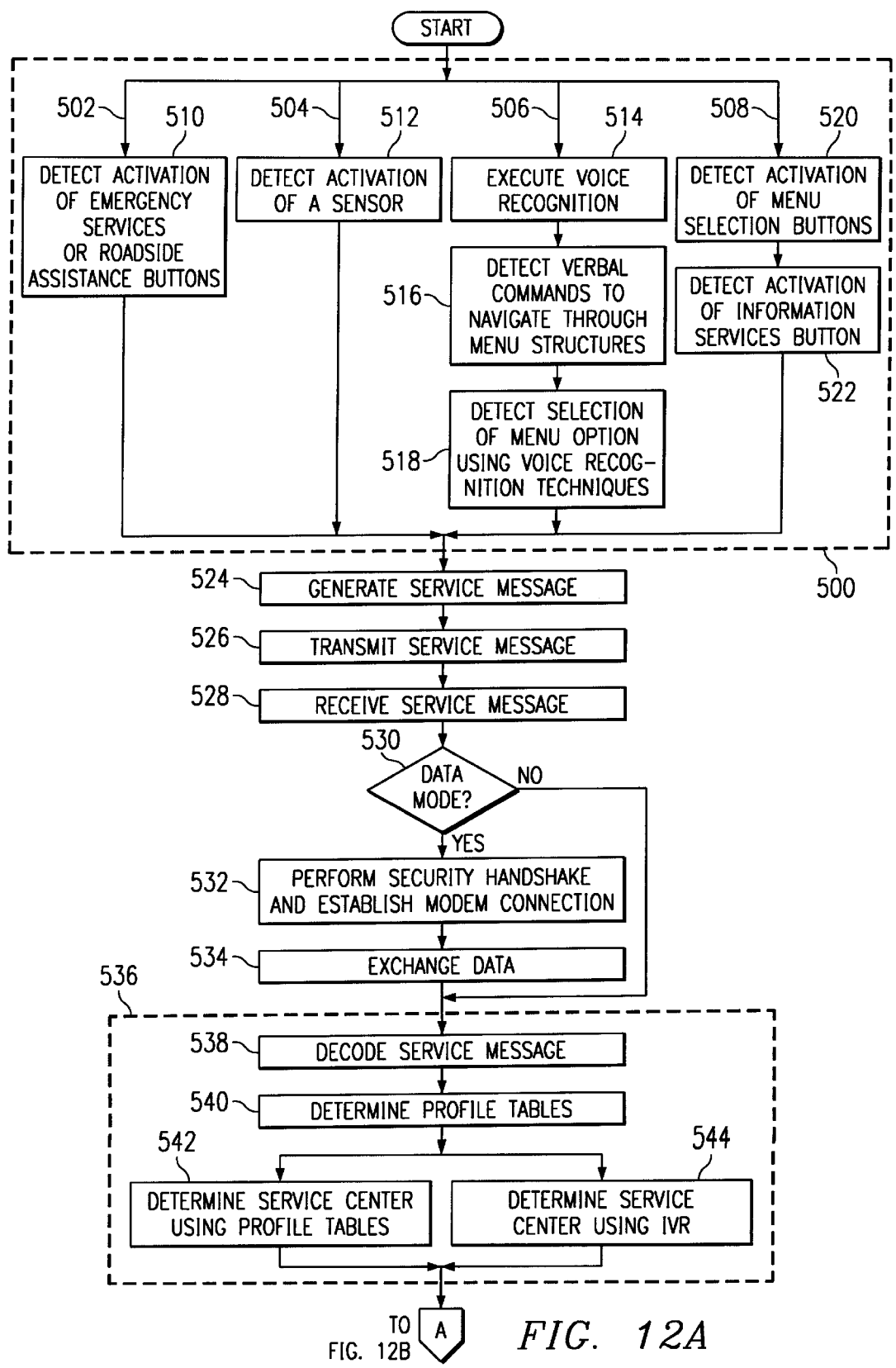
FIGS. 12A and 12B are flow charts of a method of routing a call from a mobile unit to a selected service center of the communication system.

FIG. 12A is a flow chart of a method of routing a call from mobile unit 12 to an appropriate service center 16 of communication system 10. The method begins at steps 500 where processor 38 of mobile unit 12 detects an input event, indicated by one of the four paths 502, 504, 506, or 508 in the flow chart of FIG. 12A. Referring to path 502, processor 38 detects the activation of emergency services button 214 or roadside assistance button 216 at step 510. Referring to path 504, processor 38 detects the activation of a sensor 26 at step 512. Referring to path 506, processor 38 executes voice recognition software in response to the activation of phone button 212 at step 514. Processor 38 detects verbal commands to navigate through menu options associated with menu structures 84 at step 516. In particular, the operator of mobile unit 12 navigates through menu options using IVR unit 29 and voice recognition software 68. Processor 38 detects the selection of a particular menu option using voice recognition techniques at step 518. Referring to path 508, processor 38 detects the activation of menu selection buttons at step 520. In particular, the operator of mobile unit 12 navigates through menu options associated with menu structures 84 using menu selection buttons 206–210. Processor 38 detects the activation of information services button 218 specifying a particular menu option at step 522.

In response to the detection of the input event at steps 500, processor 38 generates service message 58 at step 524. In particular, processor 38 may include in message 58 call type 400 identifying the services requested, identifier 404 and location information 406 of mobile unit 12, data mode 432, the priority level of message 58, and any other appropriate information to be used by NSC 14. Processor 38 then transmits service message 58 or priority service message 442 to NSC 14 using enhanced services NAM 88 and voice network 18 at step 526. NSC 14 receives service message 58 or priority service message 442 at step 528.

Depending on the value of data mode 432 of service message 58 at step 530, mobile unit 12 and NSC 14 may perform a security handshake and establish a modem connection at step 532. Upon establishing a secure modem connection, mobile unit 12 and NSC 14 exchange data at step 534. Data sent to NSC 14 may include additional information regarding the status and/or operation of mobile unit 12 or its associated mobile item 25. Data sent to mobile unit 12 may include software updates, remote commands, messages, or other information generated by NSC 14 and/or service centers 16. U.S. Pat. No. 5,398,810, which has been incorporated by reference, describes a particular embodiment of establishing a security handshake and modem connection to exchange data between mobile unit 12 and NSC 14. If mobile unit 12 and NSC 14 do not enter a data mode as determined at step 530 or the exchange of data is complete at step 534, then NSC 14 determines a suitable service center 16 using service message 58 and profile tables 322–326 at steps 536.

In particular, NSC 14 decodes service message 58 at step 538 to determine call type 400, identifier 404 of mobile unit 12, location information 406, and any other pertinent information. In a particular embodiment, switch 300 or IVR unit 306 receives and decodes service message 58 using DTMF techniques for more accurate and reliable reception. Call type 400 may specify a variety of services associated with a particular class of services provided by service centers 16, such as emergency services, roadside assistance, and information services. Identifier 404 of mobile unit 12 may comprise MIN/ESN 410, VIN 412, or any other suitable information associated with or identifying mobile unit 12. Location information 406 may comprise city/state information, current geographical coordinates (e.g., latitude, longitude, altitude), "from" and "to" location information, and any other suitable location information.

Using code table 320 at step 540, NSC 14 determines the proper profile tables 322–326 to select an appropriate service center 16 to satisfy the request. NSC determines the proper service center 16 using the selected profile tables 322–326 and service message 58 at step 542. For example, service message 58 may indicate a mobile unit 12 having a MIN 410 of "099–880–1234" that requests emergency services from a police department, indicated by call type 400, in Plano, Tex., indicated by location information 406. NSC 14 accesses code table 320 to determine that profile table 322a should be used to select an appropriate service center 16. NSC 14 accesses profile table 322a to select service center 16 having an identifier 402 of "12" in response to location information 406 communicated in service message 58. By using information communicated in service message 58, such as MIN/ESN 410, call type 400, and location information 406, to access appropriate profile tables 322–326, NSC 14 may select an appropriate service center 16 to satisfy the request for enhanced services issued by mobile unit 12. Alternatively, IVR unit 306 of NSC 14 interacts with the operator of mobile unit 12 at step 544 to determine a suitable service center 16. For example, IVR unit 306 may detect verbal commands and/or DTMF signals communicated by mobile unit 12 specifying a particular service center 16.

Figure 12B:
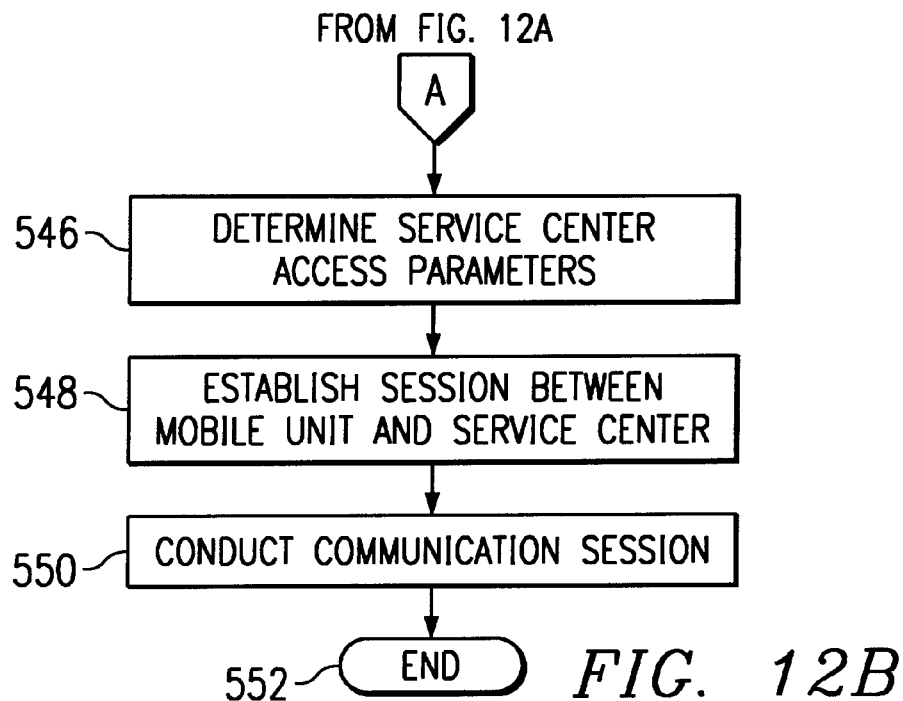

Referring to FIG. 12B, NSC 14 determines access parameters 420 and 422 that correspond to the selected service center 16 using service table 322 at step 546. NSC 14 establishes separate voice and/or data components of the communication session between mobile unit 12 and service center 16 at step 548. The operator at mobile unit 12 and an agent and/or IVR unit 358 at service center 16 conduct a communication session at step 550. In particular, service center 16 provides enhanced services, including voice and/or data services, to satisfy the request issued by mobile unit 12. In one embodiment, service center 16 downloads to mobile unit 12 directions, as described in detail in FIG. 13A. In another embodiment, service center 16 downloads to mobile unit 12 updates to configuration data 80, menu options and/or menu structures 84, and/or any other voice or data communication to satisfy the request. The communication session terminates at step 552.

Figure 13B:
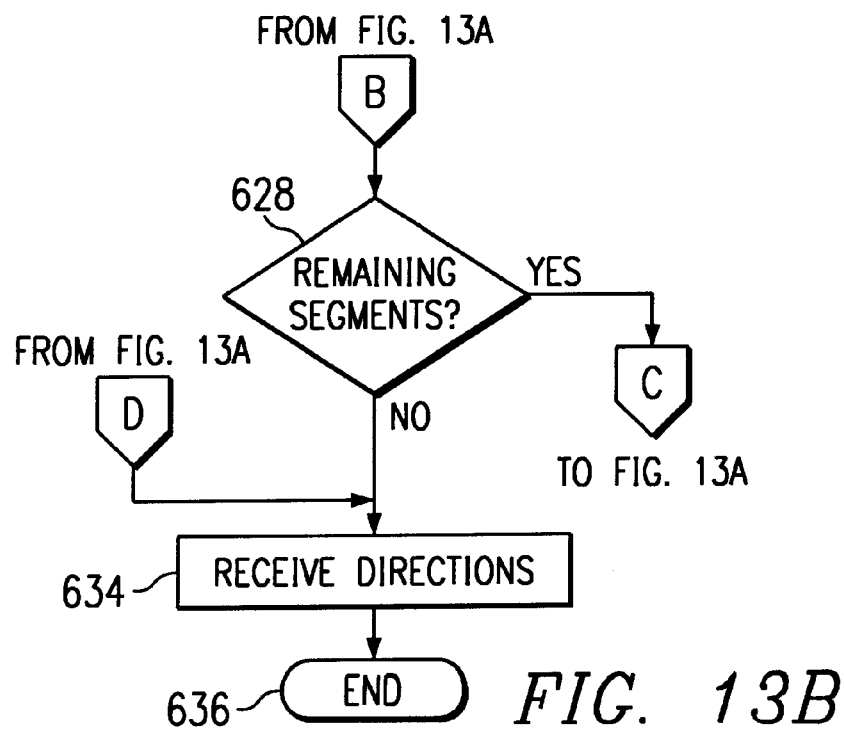
FIGS. 13A and 13B are flow charts of a method of providing directions using the communication system.
Figure 13A:
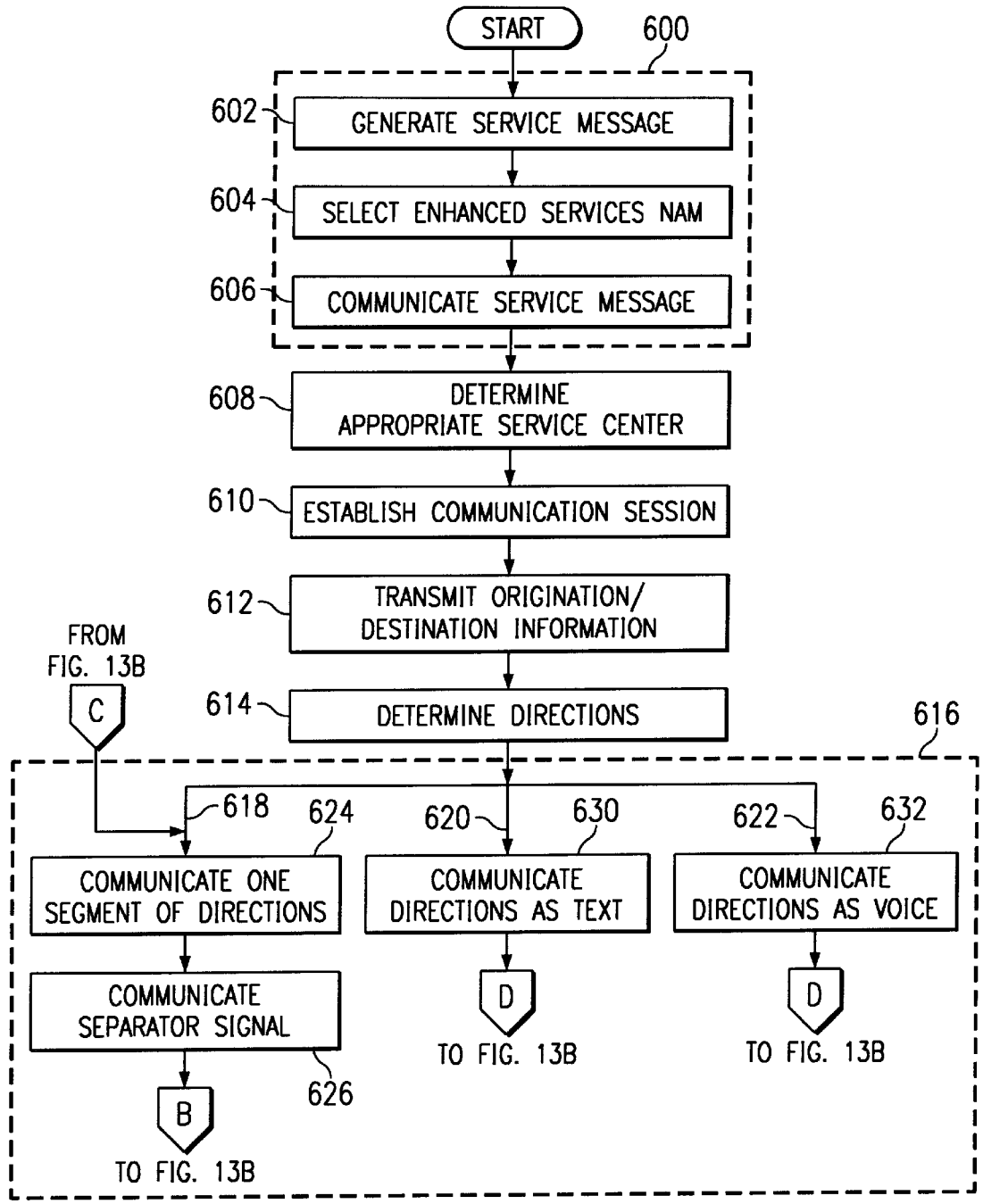

FIG. 13A is a flow chart of a method of providing directions using communication system 10. The method begins at steps 600 where an operator of mobile unit 12 initiates communication with NSC 14. In particular, processor 38 of mobile unit generates a service message 58 at step 602 in response to a suitable input event, such as the activation of information services button 218 or the selection of a particular menu option using IVR unit 29 and voice recognition software 68. For example, the operator may navigate through multiple levels of menu options presented by display 34 of user interface 22 until display 34 highlights, underlines, or in any other way specifies a menu option that enables the provisioning of directions. The operator may then activate information services button 218 or issue a verbal command specifying the menu option using voice recognition techniques.

Service message 58 includes location information such as the origination location and the destination location for the directions. As described above, the origination location of mobile unit 12 may be the current location of mobile unit 12, or any other location from which the directions will originate. The destination location comprises the location at which the directions will terminate. Service message 58 further includes call type 400 which indicates a request for information services.

Transceiver 42 of mobile unit 12 selects enhanced services NAM 88 at step 604 to establish communications with NSC 14 using voice network 18. Processor 38 communicates service message 58 to NSC 14 at step 606. NSC 14 determines the appropriate service center 16 with which to establish a communication session at step 608 based on information stored in database 122 and information retrieved from service message 58. In particular, NSC 14 uses code table 320 to determine the appropriate profile table 322–326 to access. Upon accessing the appropriate profile table for information services, (e.g., profile table 326), NSC 14 selects an appropriate service center 16 based upon, in one embodiment, location information 406. NSC 14 establishes a communication session between mobile unit 12 and the selected service center 16 at step 610. NSC 14 transmits the origination and destination location information (e.g., "from" and "to" location information) to service center 16 at step 612. In one embodiment, this information may be transmitted using voice paths and DTMF techniques. In another embodiment, this information may be transmitted as a data message using data network 20.

The selected service center 16 determines the directions in response to the origination and destination location information at step 614. In particular, the service center 16 accesses maps, traffic reports, weather reports, and any other suitable information stored in database 360 or retrieved from network 98 to determine the commands, geographical coordinates, or other suitable indicators of location associated with the directions. Service center 16 communicates the directions at steps 616 using one of three different methods illustrated by the three paths 618, 620, and 622 in the flow chart of FIG. 13A.

In one embodiment, service center 16 communicates notification and realization coordinates included in the directions. As described above, the notification coordinates may define a region, zone, geographical coordinate, or any other suitable location in proximity to the location of the next step of the directions. Similarly, realization coordinates may define a region, zone, geographical coordinate, or any other suitable location in proximity to the location of the previous step of the directions.

Referring to path 618, service center 16 communicates one segment of the directions as a voice communication using voice network 28 at step 624. Service center 16 then communicates a separator signal, such as, for example, DTMF signals, at step 626. Referring to FIG. 13B, service center 16 determines whether further segments of the directions need to be communicated at step 628. If further segments need to be communicated from service center 16 to mobile unit 12, then execution returns to step 624. If not, execution proceeds to step 634.

Referring to path 620, service center 16 communicates the directions as text in one or more data files using voice network 18, at step 630. The directions communicated as text may also be separated into different segments by separator signals or codes. In one embodiment, the different segments of the directions are separated by text delimiters. Referring to path 622, service center 16 communicates the directions as audio signals in one or more data files using voice network 18, at step 632. The directions communicated as audio signals may also be separated into different segments by suitable separator signals or codes.

Mobile unit 12 receives the directions communicated by service center 16 at step 634. In particular, processor 38 executes audio recorder 70 to record the directions and store the associated audio recordings 72 in memory 40. Execution terminates at step 636.

Figure 14:
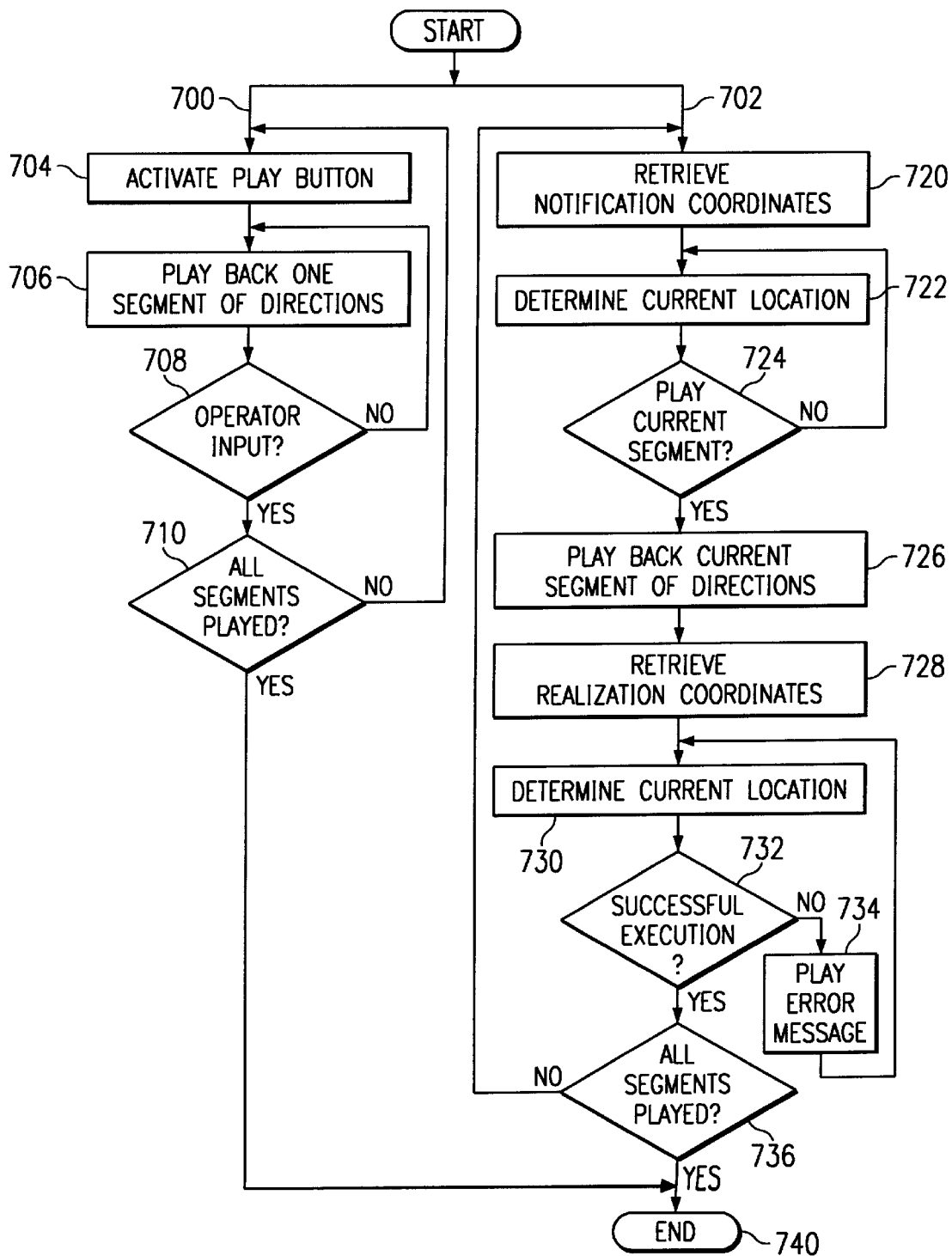
FIG. 14 is a flow chart of a method of presenting the directions.

FIG. 14 is a flow chart of a method for presenting directions communicated by service center 16 to a mobile unit 12. The method is particularly directed to playing back directions containing segments separated by appropriate separator signals or codes. The method includes a path 700 associated with manual playback of the directions, and a path 702 associated with automatic playback of the directions.

Referring to path 700, an operator of mobile unit 12 may activate play button 220 of user interface 22 at step 704. Processor 38 and audio recorder 70 play back one segment of the previously recorded directions using speakers 202 of interface 22 at step 706. In one embodiment, processor 38 executes speech synthesis software 74 to translate directions communicated as text into verbal directions to be played using speakers 202. Processor 38 determines whether the operator has input any other commands, such as activating any of audio recorder buttons 220–224 and/or issuing any verbal commands to IVR unit 29, at step 708. For example, the operator may stop playing back the directions by again activating play button 220 of user interface 22, or by verbally commanding audio recorder 70 to stop using voice recognition techniques. Processor 38 determines whether audio recorder 70 has played back each segment of the directions at step 710. If not, execution returns to step 704. If so, execution terminates at step 740.

Referring to path 702, processor 38 retrieves the notification coordinates included in the directions at step 720. Processor 38 determines the current location of mobile unit 12 at step 722. In particular, processor 38 communicates with GPS device 48 to determine the current geographical coordinates for mobile unit 12. Processor 38 determines whether to play the current segment of the directions at step 724. In particular, processor 38 determines whether the current location of mobile unit 12 substantially corresponds with a region, zone, geographical coordinate, or any other suitable indicator of location defined by the notification coordinates communicated by service center 16. If not, execution returns to step 722. If so, execution proceeds to step 726 where processor 38 causes audio recorder 70 to play back the current segment of the directions using speakers 202 of user interface 22.

Processor 38 retrieves the realization coordinates communicated by service center 16 at step 728. A predetermined interval of time after the current segment of the directions is played back, processor 38 again determines the current geographical coordinates of mobile unit 12, at step 730. Processor 38 determines whether mobile unit 12 successfully executed the current segment of the directions at step 732. In particular, processor 38 determines whether the current location of mobile unit 12 substantially corresponds with a region, zone, geographical coordinate, or any other indicator of location defined by the realization coordinates associated with the current segment of the directions. If not, execution proceeds to step 734 where processor 38 may optionally communicate an error message to the operator of mobile unit 12. In one embodiment, processor 38 replays the current segment of the directions at step 734. Execution then returns to step 730. If the current segment was successfully executed, execution proceeds to step 736. At step 736, processor 38 determines whether audio recorder 70 has played back each segment of the directions. If not, execution returns to step 720. If so, execution terminates at step 740.

Figure 15:
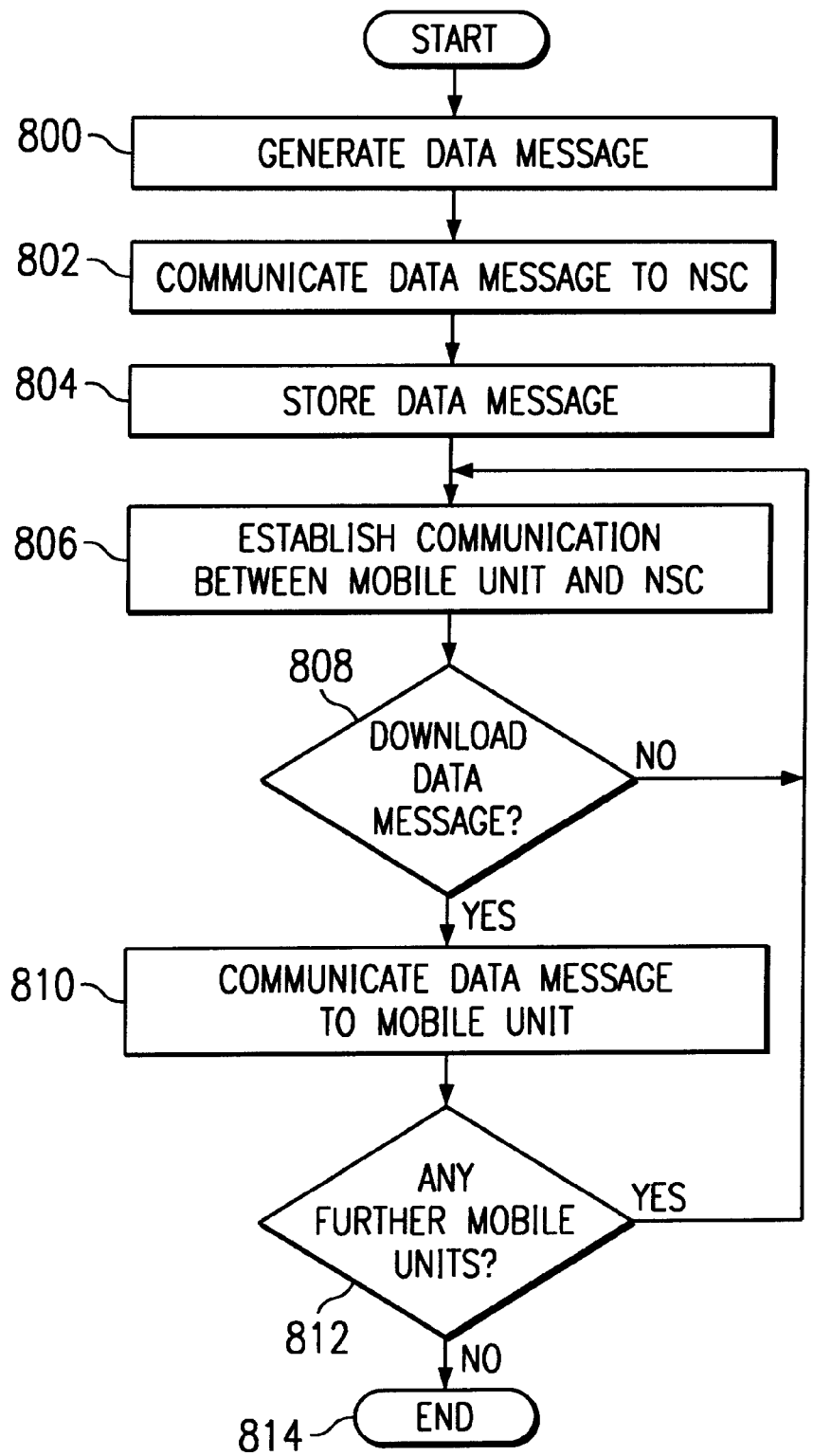
FIG. 15 is a flow chart of a method of broadcasting data from a service center to a number of mobile units using the communication system.

FIG. 15 is a flow chart of a method for broadcasting a data message from a service provider 16 to a number of mobile units 12 using communication system 10. The method begins at step 800 where service center 16 generates a data message that includes identifiers 404 of a number of specified mobile units 12 and a data field. In particular, workstations 356 access database 360 and/or global computer network 98 to include in the data field updates to menu structures 84 and/or the associated menu options, e-mail messages, voicemail messages, news reports, weather reports, sports reports, traffic reports, financial reports, or any other piece of information.

Service center 16 communicates the data message to NSC 14 at step 802. In one embodiment voice module 350 of service center 16 communicates the data message to modems 304 of NSC 14 using voice paths and DTMF techniques. In another embodiment, data module 352 of service center 16 communicates the data message to data interface 310 of NSC 14 using data network 20 and data paths 118 and 120. NSC 14 stores the data message in message queue 330 at step 804.

A mobile unit 12 establishes communication with NSC 14 at step 806. In one embodiment, mobile units 12 establish a connection with NSC 14 each time the ignition of an associated vehicle 25 is turned on, upon the detection of appropriate sensors 26, at predetermined intervals, or at any other suitable intervals. The communication with NSC 14 is established using enhanced services NAM 88 on voice network 18. Processor 314 of NSC 14 determines whether to download the data message to the mobile unit 12 at step 808. In particular, processor 314 determines whether identifier 404 of mobile unit 12 with which NSC 14 maintains a communication matches identifier 404 of one of the mobile units 12 specified in the data message communicated by service center 16. If not, execution returns to step 806 where another mobile unit 12 establishes communication with NSC 14. If so, execution proceeds to step 810 where NSC 14 communicates the data message to the mobile unit 12 using DTMF techniques and/or out-of-band signaling on voice network 18. Upon receiving the data message, mobile unit 12 may present the information using display 34 of interface 22, store the information at memory 40, or in some other way processes the information. NSC 14 determines whether any further mobile units 12 are specified in the data message to receive the data message communicated by service center 16, at step 812. If so, execution returns to step 806. If not, execution terminates at step 814.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication system, comprising:
    a mobile unit coupled to a communication network, the mobile unit comprising a user interface operable to display a plurality of menu options specified by menu data, wherein the mobile unit communicates a service message in response to a selection of a menu option at the user interface, the service message specifying a call type associated with a service enabled by the selected menu option; and
    a server coupled to the communication network and operable to:
        communicate the menu data to the mobile unit using the communication network;
        store a profile table that relates the mobile unit to a plurality of service centers;
        receive the service message communicated by the mobile unit;
        select one of the service centers using the profile table and the call type specified in the service message; and
        establish a communication session between the mobile unit and the selected service center using the communication network.

2. The communication system of claim 1, wherein the menu data comprises a menu structure specifying a hierarchical arrangement of menu options.

3. The communication system of claim 1, wherein at least one menu option displayed at the user interface enables a function associated with emergency services, roadside assistance, or information services.

4. The communication system of claim 1, wherein the selection of a menu option at the user interface initiates a communication session between the mobile unit and the server using the communication network.

5. The communication system of claim 1, wherein the user interface comprises a plurality of buttons, and wherein the activation of a button comprises a selection of a menu option.

6. The communication system of claim 1, wherein the mobile unit further comprises an interactive voice response unit operable to process verbal commands using voice recognition techniques, and wherein the issuance of a verbal command comprises a selection of a menu option.

7. The communication system of claim 1, wherein the mobile unit is associated with a vehicle.

8. The communication system of claim 1, wherein portions of the user interface are embodied in a rearview mirror of a vehicle.

9. The communication system of claim 1, wherein the communication session comprises a voice session.

10. The communication system of claim 1, wherein the communication session comprises a data session.

11. The communication system of claim 1, wherein the server supports the provisioning of services by the selected service center to the mobile unit during the communication session.

12. The communication system of claim 1, wherein the server is further operable to receive updated menu data from one of the plurality of service centers, and to communicate the updated menu data to the mobile unit.

13. A communication method, comprising:
    communicating menu data from a server to a mobile unit using a communication network such that a user interface of the mobile unit displays a plurality of menu options specified by the menu data;
    storing a profile table that relates the mobile unit to a plurality of service centers;
    receiving a service message communicated by the mobile unit, the service message specifying a call type associated with a service enabled by a selected menu option;
    selecting one of the service centers using the profile table and the call type specified in the service message; and
    establishing a communication session between the mobile unit and the selected service center using the communication network.

14. The communication method of claim 13, wherein the menu data comprises a menu structure specifying a hierarchical arrangement of menu options.

15. The communication method of claim 13, wherein at least one menu option displayed by the user interface enables a function associated with emergency services, roadside assistance, or information services.

16. The communication method of claim 13, further comprising selecting a menu option at the user interface to initiate the establishment of a communication session between the mobile unit and the server.

17. The communication method of claim 13, further comprising selecting a menu option by activating a button at the user interface.

18. The communication method of claim 13, further comprising selecting a menu option by:
    issuing a verbal command; and
    processing the verbal command at an interactive voice response unit of the mobile unit using voice recognition techniques.

19. The communication method of claim 13, wherein the mobile unit is associated with a vehicle.

20. The communication method of claim 13, wherein portions of the user interface are embodied in a rearview mirror of a vehicle.

21. The communication method of claim 13, wherein the communication session comprises a voice session.

22. The communication method of claim 13, wherein the communication session comprises a data session.

23. The communication method of claim 13, further comprising supporting the provisioning of services by the selected service center to the mobile unit during the communication session.

24. The communication method of claim 13, further comprising:
   receiving updated menu data from one of the plurality of service centers; and
   communicating the updated menu data to the mobile unit.

25. A server coupled to a mobile unit using a communication network, the server comprising:
   a memory operable to store a profile table that relates the mobile unit to a plurality of service centers; and
   a processor coupled to the memory and operable to:
      communicate menu data to the mobile unit using the communication network such that a user interface of the mobile unit displays a plurality of menu options specified by the menu data;
      receive a service message communicated by the mobile unit in response to a selection of a menu option at the user interface, the service message specifying a call type associated with a service enabled by the selected menu option;
      select one of the service centers using the profile table and the call type specified in the service message; and
      initiate establishing a communication session between the mobile unit and the selected service center using the communication network.

26. The server of claim 25, wherein the menu data comprises a menu structure specifying a hierarchical arrangement of menu options.

27. The server of claim 25, wherein at least one menu option displayed at the user interface enables a function associated with emergency services, roadside assistance, or information services.

28. The server of claim 25, wherein the communication session comprises a voice session.

29. The server of claim 25, wherein the communication session comprises a data session.

30. The server of claim 25, wherein the processor is further operable to support the provisioning of services by the selected service center to the mobile unit during the communication session.

31. The server of claim 25, wherein the processor is further operable to receive updated menu data from one of the plurality of service centers and to communicate the updated menu data to the mobile unit.

* * * * *